United States Patent [19]
Abe et al.

[11] Patent Number: 5,278,233
[45] Date of Patent: Jan. 11, 1994

[54] THERMOPLASTIC RESIN COMPOSITION

[75] Inventors: Hiroomi Abe; Takeshi Fujii, both of Chiba; Masashi Yamamoto, Ichihara; Shinji Date, Niihama, all of Japan

[73] Assignee: Sumitomo Chemical Company, Limited, Osaka, Japan

[21] Appl. No.: 713,868

[22] Filed: Jun. 12, 1991

[30] Foreign Application Priority Data

Jun. 14, 1990 [JP] Japan .................. 2-156875

[51] Int. Cl.$^5$ .................. C08L 23/12; C08L 23/10; C08L 63/00
[52] U.S. Cl. .................. 525/74; 525/240; 525/64; 525/78; 525/80; 525/403
[58] Field of Search .................. 525/74, 64, 78, 80, 525/240

[56] References Cited

U.S. PATENT DOCUMENTS

| | | | |
|---|---|---|---|
| 4,780,505 | 10/1988 | Mashita et al. | 525/183 |
| 4,789,709 | 12/1988 | Kato et al. | 525/366 |
| 4,981,896 | 1/1991 | Okada et al. | 525/166 |
| 5,004,782 | 4/1991 | Mashita et al. | 525/64 |
| 5,093,404 | 3/1992 | Okada et al. | 525/64 |
| 5,095,063 | 3/1992 | Okada et al. | 525/64 |

FOREIGN PATENT DOCUMENTS

| | | |
|---|---|---|
| 0368345 | 5/1990 | European Pat. Off. . |
| 58-217501 | 12/1983 | Japan . |
| 1-261445 | 10/1989 | Japan . |
| 1437176 | 5/1976 | United Kingdom . |

*Primary Examiner*—James J. Seidleck
*Assistant Examiner*—W. R. H. Clark
*Attorney, Agent, or Firm*—Stevens, Davis, Miller & Mosher

[57] ABSTRACT

The thermoplastic resin composition disclosed herein comprises:
(1) a resin composition consisting of
  (i) at least one member selected from the group consisting of
    (a) a modified polypropylene to which has been graft copolymerized an unsaturated carboxylic acid or the derivative thereof,
    (b) a modified polypropylene to which have been graft comodified an unsaturated aromatic monomer and either an unsaturated carboxylic acid or the derivative thereof,
    (c) a mixture of the modified polypropylene (a) and a polypropylene,
    (d) a mixture of the modified polypropylene (b) and a polypropylene,
    (e) a modified mixture of a polypropylene and a rubbery substance to which mixture has been graft copolymerized an unsaturated carboxylic acid or the derivative thereof,
    (f) a modified mixture of a polypropylene and a rubbery substance to which mixture have been graft copolymerized an unsaturated aromatic monomer and either an unsaturated carboxylic acid or the derivative thereof,
    (g) a mixture of the modified mixture (e) and a polypropylene, and
    (h) a mixture of the modified mixture (f) and a polypropylene, and
  (ii) a thermoplastic copolymer (E) containing acid anhydride moiety of six-membered ring, and
(2) an epoxy group-containing copolymer (G).

The thermoplastic resin composition according to the present invention not only exhibits excellent processability but also produces remarkable advantages in that it gives far better physical properties than those expected from each polymer which constitutes the thermoplastic resin composition of the present invention.

The novel resin composition provided by the present invention can be easily processed into molded articles, films and sheets by a molding method generally used for thermoplastic resins such as injection molding, extrusion molding, etc, and can give products which have well-balanced properties among stiffness, heat resistance, impact resistance, scratch resistance, coatability, oil resistance, chemical resistance, water resistance, etc., and which are excellent in appearance uniformity and smoothness. The thermoplastic resin composition of the present invention is particularly suitable for use where well-balanced properties among heat resistance and impact resistance, low-temperature impact resistance in particular, are required.

28 Claims, 1 Drawing Sheet

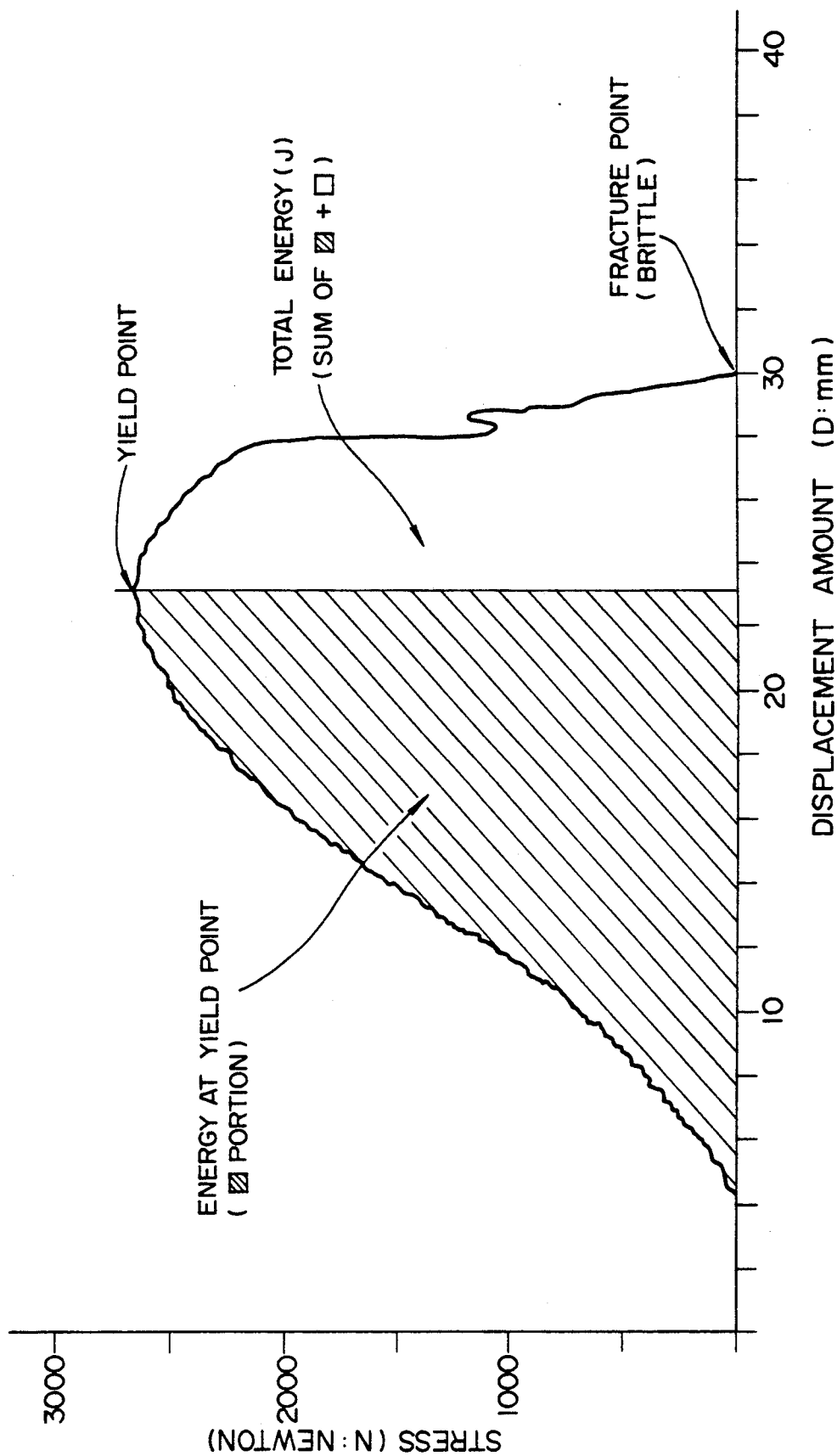

THERMOPLASTIC RESIN COMPOSITION

The present invention relates to a novel thermoplastic resin composition usable as a molded article, a sheet or a film formed by injection molding, extrusion molding, etc.

More specifically, it relates to a novel thermoplastic resin composition comprising an epoxy group-containing copolymer, a polypropylene resin and a thermoplastic copolymer containing an acid anhydride moiety of a six-membered ring, which composition has well-balanced properties and an excellent appearance Polypropylenes have heretofore been widely used in the form of various molded articles, films and sheets due to their excellent molding processability, toughness, water resistance, gasoline resistance, chemical resistance, etc., and due to their low specific gravity and low cost.

However, polypropylenes have defects, which should be improved, in heat resistance, stiffness, impact resistance, scratch resistance, coating properties, adhesive properties, printability, etc. These defects constitute an obstacle to introduction thereof to new areas in practical use.

For the purpose of improving coating properties, adhesive properties, printability, etc., of the above properties, for example, JP-B-58-47418 and JP-A-58-49736, etc., propose a method of partially or wholly graft-modifying a Polypropylene with an unsaturated carboxylic acid or the derivative thereof such as maleic anhydride However, even the use of such a modified polypropylene does not essentially improve the impact resistance, heat resistance, stiffness and the other properties.

Meanwhile, being excellent in heat resistance, a thermoplastic copolymer containing an acid anhydride moiety of a six-membered ring is inferior in mechanical strength typified by impact resistance, and therefore, the use thereof as a molding material is considerably limited in a practical sense.

From such a viewpoint, a wide new area in use can be expected if a thermoplastic resin having advantages of both a polypropylene resin and a thermoplastic copolymer containing an acid anhydride moiety of a six-membered ring can be obtained by blending the polypropylene resin selected from a modified polypropylene and a composition of a polypropylene and a modified polypropylene with a thermoplastic copolymer containing an acid anhydride moiety of a six-membered ring.

However, it has been conventionally considered that a combination of a polypropylene resin with a thermoplastic copolymer containing an acid anhydride moiety of a six-membered ring is mutually poor in compatibility and dispersibility, and a mere blend of these actually has the following problems.

(1) A molten polymer shows a high Barus effect, and it is substantially impossible to take up an extruded strand stably. Thus, molding workability is decreased to a great extent.

(2) An injection-molded article shows extreme nonuniformity and poor appearance due to occurrence of flow marks. Thus, such an injection-molded article is not practically usable as an automobile part, an electric or electronic part, etc.

(3) A molded article formed of a mixture of a Polypropylene resin with a thermoplastic copolymer containing an acid anhydride moiety of a six-membered ring often shows lower values in mechanical properties such as impact resistance, tensile elongation, etc., in particular than expected from the additivity of the individual properties of these components.

A resin for use in automobile parts, electric and electronic parts, etc., is required to show high-level performances such as high heat resistance, high impact resistance, etc.

It is therefore an object of the present invention to provide a novel thermoplastic resin composition having high heat resistance and high impact resistance in particular and being well-balanced in other properties.

According to the present invention, there is provided a thermoplastic resin composition which comprises:
(1) 100 parts by weight of a resin composition (F) consisting of
  (i) 1-99% by weight of at least one member selected from the group consisting of
    (a) a modified polypropylene (A) to which has been graft copolymerized an unsaturated carboxylic acid or the derivative thereof,
    (b) a modified polypropylene (B) to which have been graft comodified an unsaturated aromatic monomer and either an unsaturated carboxylic acid or the derivative thereof,
    (c) a mixture of the modified polypropylene (A) and a polypropylene (C),
    (d) a mixture of the modified polypropylene (B) and a polypropylene (C),
    (e) a modified mixture (A') of a polypropylene (C) and a rubbery substance (H) to which mixture has been graft copolymerized an unsaturated carboxylic acid or the derivative thereof,
    (f) a modified mixture (B') of a polypropylene (C) and a rubbery substance (H) to which mixture have been graft copolymerized an unsaturated aromatic monomer and either an unsaturated carboxylic acid or the derivative thereof,
    (g) a mixture of the modified mixture (A') and a polypropylene (C), and
    (h) a mixture of the modified mixture (B') and a polypropylene (C), and
  (ii) 99-1% by weight of a thermoplastic copolymer (E) containing acid anhydride moiety of six-membered ring, and
(2) 0.1 to 300 parts by weight of an epoxy group-containing copolymer (G).

One example of measurement charts in evaluation of penetration impact strength is shown in FIG. 1, in which the abscissa axis indicates a displacement amount (D: mm) for deformation of a test piece and the ordinate axis indicates a stress (N: newton) to a displacement amount.

A yield point is a point where a stress to a displacement amount changes from increment to decrement, and a breaking point is a point where a material is fractured and a change in stress disappears.

A yield point energy is an area integration of a displacement amount and stress from a start of stress detection to a yield point of a material, and a total energy is an area integration of a displacement amount and stress from a start to a breaking point.

To begin with, the polypropylene is described in detail. The term "polypropylene" in the present specification is used to mean a starting material for the modified polypropylene (A) or (B), or the modified mixture (A') or (B') of a polypropylene and a rubbery substance.

In the present invention, the "polypropylene" is a crystalline polypropylene, which includes, besides a polypropylene homopolymer, a block copolymer obtained by polymerizing propylene at a first step and copolymerizing the resultant polypropylene with ethylene and a α-olefin such as propylene, butene-1, etc., at a second step; and a random copolymer obtained by copolymerizing propylene with not more than 6% by mole of an α-olefin such as ethylene, butene-1, etc.

The polypropylene homopolymer, block copolymer or random copolymer can be generally produced by polymerization, e.g. in the presence of a combined catalyst of titanium trichloride with an alkyl aluminum compound which is generally called a Ziegler-Natta catalyst.

The polymerization can be carried out at a temperature between 0° C. and 300° C. In high-stereoregularity polymerization of an α-olefin such as propylene, etc., however, a polymer having high stereoregularity cannot be obtained at a temperature of more than 100° C. For this reason and some others, the polymerization is carried out preferably at a temperature between 0° C. and 100° C.

The polymerization pressure is not critical, and can be desirably selected from about 3 to about 100 atmospheric pressures from an industrial and economical point of view.

The polymerization method may be any of a continuous method and a batch method.

The polymerization method can be selected from a slurry polymerization method using an inert hydrocarbon solvent such as butane, pentane, hexane, heptane, octane, or the like; a solvent polymerization method in which the resulting polymer is dissolved in said inert hydrocarbon solvent; a solventless bulk polymerization method in which a liquefied monomer is polymerized; and a gas phase polymerization method in which a gaseous monomer is polymerized.

In order to regulate the molecular weight of the resultant polymer, a chain transfer agent such as hydrogen may be added.

The polypropylene used in the present invention can be produced in the presence of an isospecific Ziegler-Natta catalyst. The catalyst preferably has a high isospecificity.

It is preferred to use a catalyst whose transition metal catalyst component is a composite solid compound of a titanium trichloride or magnesium compound having a laminar crystalline structure and a titanium compound, and whose typical metal component is an organoaluminum compound. The catalyst may contain a known electron-donating compound as a third component.

The titanium trichloride is selected from those which are produced by reduction of titanium tetrachloride with a variety of reducing agents. As a reducing agent, there are known metals such as aluminum, titanium, etc., hydrogen, an organometal compound, and the like. A typical example of the titanium trichloride produced by metal reduction is a titanium trichloride composition containing activated aluminum chloride ($TiCl_3AA$), produced by reducing titanium tetrachloride with metal aluminum and then pulverizing the resultant mixture in an apparatus such as a ball mill or a vibration mill. In order to improve isospecificity, polymerization activity and/or particulate properties of the catalyst, the above pulverization may be carried out in the presence of a compound selected from an ether, a ketone, and ester, aluminum chloride, titanium tetrachloride, etc.

Further preferred for the object of the present invention is titanium trichloride which is obtained by reducing titanium tetrachloride with an organoaluminum compound, and catalytically reacting the resultant titanium trichloride with an ether compound and with a halogen compound at the same time or consecutively. The ether compound preferably has the general formula of $R^1$—O—$R^2$ in which each of $R^1$ and $R^2$ is an alkyl group having 1 to 18 carbon atoms, and particularly preferred are di-n-butyl ether and di-t-amyl ether. In particular, a preferred halogen is iodine, the preferred halogen compound is iodine trichloride, a preferred titanium halide is titanium tetrachloride, and a preferred halogenated hydrocarbon is selected from carbon tetrachloride and 1,2-dichloroethane. The organoaluminum compound has general formula of $AlR^3_nX_{3-n}$ in which $R^3$ is a hydrocarbon carbon group having 1 to 18 carbon atoms, X is a halogen selected from Cl, Br and I, and n is defined by $3 \geq n > 1$, and diethylaluminum chloride and ethylaluminum sesquichloride are particularly preferred.

The process for the production of the above titanium trichloride is specifically disclosed in JP-A-47-34470, JP-A-53-33289, JP-A-53-51285, JP-A-54-11986, JP-A-58-142903, JP-A-60-28405, JP-A-60-228504, JP-A-61-218606, etc.

When titanium trichloride having a laminar crystalline structure is used as a transition metal compound component, it is preferred to use, as a typical metal compound component, an organoaluminum compound having the general formula of $AlR^4_mX_{3-m}$ in which $R^4$ is a hydrocarbon group having 1 to 18 carbon atoms, X is a halogen selected from Cl, Br and I, and m is defined by $3 \geq m > 0$. Particularly preferred for the object of the present invention is a compound of the above general formula in which $R^4$ is an ethyl or isobutyl group and m is defined by $2.5 \geq m > 1.5$. Specific examples thereof are diethylaluminum chloride, diethylaluminum bromide, diethylaluminum iodide, and mixtures of these with triethylaluminum or ethylaluminum dichloride. When a third component to be discussed later is used in combination, preferred for the object of the present invention is also an organoaluminum compound of the above general formula in which m is defined by $3 \geq m > 2.5$ or $1.5 \geq m > 0$.

The molar ratio of organoaluminum compound to titanium trichloride can be selected from between 1 : 1 and 1,000 : 1.

The catalyst comprising titanium trichloride and organoaluminum may contain a known third component. Examples of the third component are ester compounds such as ε-caprolactam, methyl methacrylate, ethyl benzoate, methyl totluylate, etc., phosphite esters such as triphenyl phosphite, tributyl phosphite, etc., and phosphoric acid derivatives such as hexamethylphosphorictriamide, etc., and the like.

The amount of the third component may be experimentally determined, since the activity varies depending upon the compounds above. In general, it is not more than an equimolar amount to that of the organoaluminum.

When a composite solid compound of a magnesium compound and a titanium compound is used as a transition metal solid catalyst component, it is preferred to use, as a typical metal catalyst component, an organoaluminum compound, and it is particularly preferred to use a compound having the general formula of $AlR^5_pX_{3-p}$ in which $R^5$ is a hydrocarbon group having 1 to 18 carbon atoms, X is a halogen selected from Cl, Br and I and p is defined by $3 \geq p > 2$. Specific examples thereof are triethylaluminum, triisobutylaluminum and mixtures of these with diethylaluminum chloride or diisobutylaluminum chloride.

The catalyst also preferably contains an electron-donating compound, particularly an aromatic monocarboxylic acid ester and/or a silicon compound containing an Si—OR$^6$ bond.

As a silicon compound containing an Si—OR$^6$ bond in which R$^6$ is a hydrocarbon group having 1 to 20 carbon atoms, preferred is an alkoxysilane compound having the general formula of R$^7_a$Si(OR$^6$)$_{4-a}$ in which each of R$^6$ and R$^7$ is independently a hydrocarbon group having 1 to 20 carbon atoms and a is defined by $0 \leq a \leq 3$. Specific examples thereof are tetramethoxysilane, methyltrimethoxysilane, dimethyldimethoxysilane, ethyltrimethoxysilane, phenyltrimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane, diethyldiethoxysilane, etc.

The amount of the above electron-donating compound for use is preferably not more than 1 mole, particularly preferably 0.05 to 1 mole per mole of the organoaluminum compound.

The composite solid compound of a magnesium compound and a titanium compound is selected from titanium trichloride containing a chloride of magnesium obtained by reducing titanium tetrachloride with an organomagnesium compound, and a so-called "supported catalyst" prepared by catalytically reacting a solid magnesium compound with a liquid-phase titanium compound. The solid magnesium compound preferably contains an electron-donating compound, particularly an aromatic monocarboxylic acid ester, an aromatic dicarboxylic acid diester, an etherified compound, an alcohol and/or a phenolic compound. The aromatic monocarboxylic acid ester may be co-present when the solid magnesium compound is catalytically reacted with the titanium compound.

The above composite solid compound of the magnesium compound and the titanium compound is disclosed in many patent publications, and those suitable for the object of the present invention are specifically disclosed in JP-A-54-112988, JP-A-54-119586, JP-A-56-30407, JP-A-57-59909, JP-A-57-59910, JP-A-57-59911, JP-A-57-59912, JP-A-57-59914, JP-A-57-59915, JP-A-57-59916, JP-A-54-112982, JP-A-55-133408, JP-A-58-27704, etc.

When the thermoplastic resin composition of the present invention is used in fields where heat resistance, stiffness, scratch resistance, etc., are particularly required, it is desirable to use a highly crystalline polypropylene which is a homopolymer of polypropylene or a polypropylene block copolymer, wherein the homopolymer or the homopolymer portion as a first segment polymerized in the first step for the block copolymer has an isotactic pentad of the boiling heptane insoluble portion of 0.970 or more, a content of the boiling heptane soluble portion of not more than 5% by weight and a content of the 20° C. xylene soluble portion of not more than 2.0% by weight.

The above isotactic pentad of the boiling heptane insoluble portion, the content of the boiling heptane soluble portion and the content of the 20° C. xylene soluble portion are determined as follows.

Five grams of a Polypropylene is completely dissolved in 500 ml of boiling xylene, the resultant solution is cooled to 20° C., and the solution was allowed to stand for 4 hours. Then, the solution was filtered to separate a 20° C. xylene insoluble portion. Xylene was evaporated by concentrating the filtrate and solidifying it by drying, and the residue is further dried under reduced pressure at 60° C. to obtain a polymer soluble in xylene at 20° C. The content of the 20° C. xylene soluble portion is determined by dividing the dry weight of the soluble polymer sample by the weight of the charged sample, and represented by percentage. The above 20° C. xylene insoluble portion is dried, and then extracted with boiling n-heptane in a Soxhlet apparatus for 8 hours. The extraction residue is referred to as a boiling heptane insoluble portion, and the content of the boiling heptane soluble portion is determined by subtracting the dry weight of the boiling heptane insoluble portion from the weight of the charged sample (5 g) and dividing the remainder by the weight of the charged sample, and represented by percentage.

The isotactic pentad refers to a fraction of a propylene monomer unit present in the central position of an isotactic chain of a polypropylene molecule chain in a pentad unit, in other words, in a chain formed of meso-bonded five successive propylene monomer units, determined by a method disclosed by A. Zambelli et al., in Macromolecules, 6, 925 (1973), which utilizes $^{13}$C-NMR. NMR absorption peaks are assigned on the basis of the subsequently issued Macromolecules, 8, 687 (1975).

Specifically, the isotactic pentad is determined on the basis of a relative ratio of the area of mmmm peaks to the total area of the absorption peaks assigned to methyl carbons. According to this method, the NPL standard substance CRM No. M19-14 Polypropylene PP/WWD/2 provided by the National Physical Laboratory in United Kingdom was measured for an isotactic pentad to show 0.944.

The above highly crystalline polypropylene can be prepared, for example, by any of the methods disclosed in JP-A-60-28405, JP-A-60-228504, JP-A-61-218606, JP-A-61-287917, etc.

when the thermoplastic resin composition of the present invention is used in fields where impact resistance is required, it is preferred to use a polypropylene block copolymer obtained by copolymerizing a propylene homopolymer portion as the first segment having been polymerized in the first step with ethylene and an α-olefin such as propylene butene-1, etc., which constitute the second segment, in the second step.

The propylene block copolymer can be prepared by a slurry polymerization or gas phase polymerization method. In particular, when the thermoplastic resin composition is used in a fluid where high impact resistance is required, it is required to increase the amount of the second segment, and such a propylene block copolymer can be suitably prepared by a gas phase polymerization method.

The polypropylene having high impact resistance can be prepared by a gas phase polymerization method disclosed, e.g. in JP-A-61-287917.

In the propylene block copolymer, the propylene homopolymer portion polymerized in the first step may be any of a propylene homopolymer or a copolymer of propylene with ethylene or an α-olefin having 4 to 6 carbon atoms wherein the content of the ethylene or α-olefin units is not more than 6 mole%. The copolymer Portion as the second segment polymerized in the second step is preferably a homopolymer of ethylene or a copolymer of ethylene, propylene and optionally an α-olefin having 4 to 6 carbon atoms wherein the ethylene content is not less than 10 mole%. The amount of the polymer formed in the second step is 10 to 70% by weight based on the total polymer weight.

The slurry polymerization method gives a propylene block copolymer having a second segment content of 10 to 30% by weight, and the gas phase polymerization method gives a propylene block copolymer having a second segment content of 10 to 70% by weight.

In the gas phase polymerization method, a propylene block copolymer having a larger content of the second segment can be prepared by a process disclosed in JP-A-1-98604 (1989), and such a copolymer can be suitably used in a field where ultrahigh impact resistance is required.

The intrinsic viscosity of the second segment in tetralin at 135° C. should be changed depending upon production efficiency, physical properties of a polymer powder and an intrinsic viscosity of the first segment. In general, however, it is 3–8 dl/g for the slurry polymerization method and 1 to 5 dl/g for the gas phase polymerization method.

In the present invention, the modified polypropylene (A) or (B) means that which is obtained by graft-polymerizing an unsaturated carboxylic acid or the derivative thereof, or a mixture of an unsaturated carboxylic acid or the derivative thereof and an unsaturated aromatic monomer onto a polypropylene, if necessary, in the presence of a radical initiator.

When the above monomers are grafted to a polypropylene, various conventional methods can be employed.

For example, the grafting can be carried out by a method which comprises mixing polypropylene, a graft monomer and a radical-generating agent and melt-kneading the resultant mixture in a melt-kneading apparatus, or by a method which comprises dissolving polypropylene in an organic solvent such as xylene, adding a radical-generating agent under a nitrogen atmosphere, carrying out a reaction of the resultant mixture by heating it with stirring, cooling the reaction mixture after the reaction, washing the reaction product, filtering it and drying it. Besides the above methods, there can be employed a method which comprises irradiating a polypropylene with ultraviolet light or radiation in the presence of a graft monomer or a method which comprises bringing a polypropylene into contact with oxygen or ozone in the presence of a graft monomer.

In view of economical efficiency, etc., the most preferred is the graft polymerization method which comprises melt-kneading a polypropylene and a graft monomer in a melt-kneading apparatus.

The melt-kneading of a polypropylene and an unsaturated carboxylic acid or the derivative thereof, or a polypropylene and a mixture of an unsaturated carboxylic acid or the derivative thereof and an unsaturated aromatic monomer in the presence of a radical initiator, if necessary, can be carried out with an extruder, a Banbury mixer, a kneader, etc. at a temperature of 150° to 300° C., preferably 190° to 280° C. for a residence time of 0.3 to 10 minutes, preferably 0.5 to 5 minutes. It is industrially advantageous to continuously produce a modified polypropylene with a single- or twin-screw extruder with keeping the vent holes in a vacuous state and removing unreacted components (unsaturated carboxylic acid or the derivative thereof, unsaturated aromatic monomer, radical initiator, etc.) and by-products such as oligomers and decomposition products of these components. The reaction may be carried out in an atmosphere of air, but is preferably carried out in an atmosphere of an inert gas such as nitrogen or carbon dioxide. In addition, in order to further remove a trace amount of unreacted components and by-products contained in the modified polypropylene obtained, the modified polypropylene may be heat-treated at a temperature of 60° C. or higher, extracted with a solvent or vacuumed while melted.

A variety of additives may be optionally added to the modified polypropylene (A) or (B) during the modification or post-treatment. Examples of such additives are an antioxidant, a heat stabilizer, a light stabilizer, a nucleating agent, a lubricant, an antistatic agent, an inorganic or organic colorant, a rust preventive, a crosslinking agent, a foaming agent, a plasticizer, a fluorescent agent, a surface treating agent, a surface brightener, etc.

Examples of the unsaturated carboxylic acid or the derivative thereof, used for the polypropylene modification, are unsaturated carboxylic acids such as acrylic acid, methacrylic acid, maleic acid, itaconic acid, citraconic acid, bicyclo[2.2.1]hept-5-ene-2,3-dicarboxylic acid (himic acid), bicyclo[2.2.2]oct-5-ene-2,3-dicarboxylic acid, 4-methylcyclohex-4-ene1,2-dicarboxylic acid, 1,2,3,4,5,8,9,10-octahydronaphthalene-2,3-dicarboxylic acid, bicyclo[2.2.1]-oct-7-ene-2,3,5,6-tetracarboxylic acid, 7-oxabicyclo[-2.2.1]hept-5-ene-2,3-dicarboxylic acid, etc.; and acid anhydrides, esters, amides, imides and metal salts of an unsaturated carboxylic acid such as maleic anhydride, itaconic anhydride, citraconic anhydride, bicyclo[2.2.1]-hept-5-ene-2,3-dicarboxylic acid anhydride (himic anhydride), monoethyl maleate, monomethyl fumarate, monomethyl itaconate, dimethylaminoethyl methacrylate, dimethylaminopropylacrylamide, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, sodium acrylate, sodium methacrylate, potassium acrylate, potassium methacrylate, etc.

Of these, maleic anhydride is preferred.

Although styrene is preferred as an unsaturated aromatic monomer, o-methylstyrene, p-methylstyrene, m-methylstyrene, α-methylstyrene, vinyltoluene, vinylbenzene, etc., can be also used. These compounds may be used in combination.

The polypropylene modification can be also carried out in the absence of a radical initiator. In general, however, it is carried out preferably in the presence of a radical initiator. Known radical initiators are usable as such. Examples of the radical initiator are azo compounds such as 2,2'-azobisisobutyronitrile, 2,2'-azobis(2,4,4)-trimethylvaleronitrile, etc.; and various organic Peroxides such as methyl ethyl ketone peroxide, cyclohexanone peroxide, 3,3,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butylperoxy)hexyne-3, lauroyl peroxide, 3,3,5-trimethylhexanoyl peroxide, benzoyl peroxide, t-butyl peracetate, t-butylperoxyisobutyrate, t-butyloxypivarate, t-butylperoxy-2-ethylhexanoate, t-butylperoxy-3,5,5-trimethylhexanoate, t-butylperoxylaurate, t-butylperoxybenzoate, di-t-butylperoxyisophthalate, 2,5-dimethyl-2,5-di(benzoylperoxy)hexane, t-butylperoxymaleic acid, t-butylperoxyisopropylcarbonate, polystyrene peroxide, etc.

In the modification, the melt flow rate of the polypropylenes as a starting material (crystalline propylene homopolymer, crystalline propylene-ethylene/ α-olefin block copolymer and crystalline propyleneethylene/α-olefin random copolymer) is not critical. Usually, however, it is 0.05 to 60 g/10 minutes, preferably 0.1 to 40 g/10 minutes. Further, it is desirable to select a polypropylene as a starting material so that the melt flow rate of the resultant modified polypropylene (A) or (B) preferably falls within the range of 0.1 to 100 g/10 minutes, more preferably 0.5 to 70 g/10 minutes. The polypropylene as a starting material usually has a number average molecular weight of 7,000 to 800,000, preferably 10,000 to 700,000.

For the modification, the amount of each component per 100 parts by weight of the polypropylene is as follows. The amount of the unsaturated carboxylic acid or the derivative thereof is preferably 0.01 to 10 parts by weight, more preferably 0.1 to 5 parts by weight, and that of the radical initiator is preferably 0 to 5 parts by weight, more preferably 0.001 to 2 parts by weight. When the amount of the unsaturated carboxylic acid or the derivative thereof is less than 0.01 part by weight, there are cases where no remarkable effect can be produced on the modification. When it exceeds 10 parts by weight, the effect on the modification tends to arrive at its limit, and sometimes any further effect is not exhibited. Moreover, the use of such an excess amount tends to be practically undesirable, since a large amount of the unsaturated carboxylic acid or the derivative thereof remaining unreacted in the resultant polymer sometimes causes offensive smell and degradation in physical properties of the thermoplastic resin composition. The use of the radical initiator in an amount of more than 5% by weight tends to be practically undesirable, since it sometimes gives no further remarkable effect on the graft reaction of the unsaturated carboxylic acid or the derivative thereof and since the polypropylene is sometimes decomposed to a great extent to change the fluidity (melt flow rate) greatly.

In the present invention, the modified polypropylene-based resin composition (D) includes (a) a modified polypropylene (A) to which has been graft copolymerized an unsaturated carboxylic acid or the derivative thereof, (b) a modified polypropylene (B) to which have been graft copolymerized an unsaturated aromatic monomer and either an unsaturated carboxylic acid or the derivative thereof, (c) a mixture of the modified polypropylene (A) and a polypropylene (C) or (d) a mixture of the modified polypropylene (B) and a polypropylene (C). Preferred are those having a melt flow rate of 0.1 to 100 g/10 minutes, and particularly preferred are those having a melt flow rate of 0.5 to 40 g/10 minutes.

The thermoplastic copolymer containing an acid anhydride moiety of a six-membered ring, used in the present invention, is preferably selected from those which contain 10 to 95% by weight, preferably 15 to 90% by weight, of (1) methyl methacrylate units, and 5 to 35% by weight, preferably 8 to 30% by weight of (2) methacrylic acid and/or acrylic acid units and (3) units of acid anhydride moiety of six-membered ring of the formula,

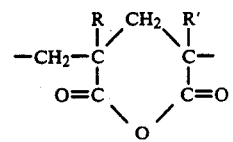

Wherein R and R' are independently methyl or hydrogen, the content of said units of acid anhydride moiety of six-membered ring being not less than 55% by weight, preferably not less than 60% by weight based on the total amount of (2) and (3), and which optionally contains, at most 55% by weight, preferably at most 50% by weight of (4) an α,β-ethylenically unsaturated monomer.

When the amount of the methyl methacrylate units (1) in the above copolymer is less than 10% by weight, the strength of the copolymer tends to be undesirably deteriorated. When this amount is more than 95% by weight, the heat deformation resistance is sometimes insufficient and undesirable.

When the total amount of the methacrylic acid and/or acrylic acid units (2) and the units of the acid anhydride of six-membered ring (3) is less than 5% by weight, there are some cases where improvement in the heat deformation resistance is insufficient.

Further, when the amount of the above (3) based on the total amount of the above (2) and (3) is less than 55% by weight, the water absorption ratio is liable to increase, and, there are some cases, with regard to moldability, where a splash mark (silver streaks) occurs and impairs a molded article appearance.

This copolymer is required to have a suitable molecular weight since it is processed by molding. When the molecular weight of this copolymer is, expressed by way of a reduced viscosity (N,N-dimethylformamide solvent, 1% concentration, 25° C.), the value for the reduced viscosity thereof is preferably in the range of from 0.3 to 1.5 dl/g.

When this value is less than 0.3 dl/g, the mechanical properties are liable to be low. When it exceeds 1.5 dl/g, the fluidity tends to be decreased, and the processability tends to be deteriorated.

The α,β-ethylenically unsaturated monomer (4) is selected from those which are usually used as a monomer for general purpose thermoplastic resin.

Examples thereof are olefins, vinyl chloride, acrylonitrile, aromatic vinyl compounds, unsaturated carboxylic acid alkyl esters, etc.

Of these, preferred are one or more members selected from unsaturated carboxylic acid alkyl esters and aromatic vinyl compounds.

Specific examples of the unsaturated carboxylic acid alkyl esters are methacrylic acid esters and acrylic acid esters, and more specifically, they are n-butyl methacrylate, t-butyl methacrylate, n-bornyl methacrylate, isobornyl methacrylate, fenchyl methacrylate, cyclohexyl methacrylate, phenyl methacrylate, benzyl methacrylate, dicyclopentanyl methacrylate, methyl acrylate, ethyl acrylate, butyl acrylate, etc. Specific examples of the aromatic vinyl compounds are styrene, α-methylstyrene, etc.

This copolymer is prepared as follows. At first, one or more members selected out of methyl methacrylate, methacrylic acid and acrylic acid, and optionally, other copolymerizable α,β-ethylenically unsaturated monomer are polymerized in the presence of a radical initiator and in the presence of a chain transfer agent by a known suspension polymerization, bulk polymerization, emulsion polymerization or solution polymerization method, whereby a precursor copolymer is obtained.

Thereafter, the precursor copolymer is subjected to a cyclization polymerization to form a cyclic product of the methacrylic acid.

In general, the above cyclization reaction is carried out by only heating the base copolymer at 150° to 350° C. as described in JP-A-49-85184, JP-A-58-217501, etc.

In order to accelerate the reaction efficiently, it is possible to employ a method using a ring-closing promoter such as a method using a basic compound as described in JP-A-254608 or a method using an organic carboxylic acid salt and/or a carbonic acid salt as described in JP-A-61-261303.

The reduced viscosity can be adjusted with using a chain transfer agent when said precursor copolymer is prepared.

The epoxy group-containing copolymer (G) in the present invention is a copolymer composed of an unsaturated epoxy compound and an ethylenically unsaturated compound.

The composition ratio of the epoxy group-containing copolymer (G) is not critical. In general, however, preferred is a copolymer containing 0.1 to 50% by weight, preferably 1 to 30% by weight of an unsaturated epoxy compound.

The unsaturated epoxy compound is a compound containing an epoxy group and an unsaturated group copolymerizable with an ethylenically unsaturated compound in the molecule.

Specific examples of the unsaturated epoxy compound are unsaturated glycidyl esters and unsaturated glycidyl ethers which have the following formulae (2) and (3), respectively.

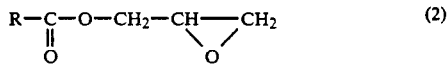
(2)

wherein R is a $C_2$-$C_{18}$ hydrocarbon group having an ethylenically unsaturated bond.

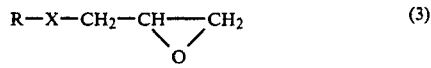
(3)

wherein R is a $C_2$-$C_{18}$ hydrocarbon group having an ethylenically unsaturated bond, and X is

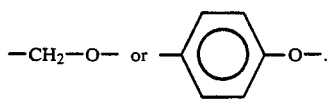

Specific examples of the unsaturated epoxy compound are glycidyl acrylate, glycidyl methacrylate, glycidyl itaconate, allylglycidyl ether, 2-methylglycidyl ether, styrene-p-glycidyl ether, etc.

Examples of the ethylenically unsaturated compound are olefins, vinyl esters of a saturated carboxylic acid having 2 to 6 carbon atoms, esters of at least one saturated alcohol having 1 to 8 carbon atoms with any one of acrylic acid, methacrylic acid, maleic acid, methacrylic acid and fumaric acid, vinyl halides, styrenes, nitriles, vinyl ethers, acrylamides, etc.

Specific examples of the ethylenically unsaturated compound are ethylene, propylene, butene-1, vinyl acetate, methyl acrylate, ethyl acrylate, methyl methacrylate, dimethyl maleate, diethyl fumarate, vinyl chloride, vinylidene chloride, styrene, acrylonitrile, isobutylvinyl ether, acrylamide, etc. Of these, ethylene is particularly preferred.

In order to improve the low-temperature impact resistance by decreasing a glass transition temperature, it is preferable to use vinyl acetate and/or methyl acrylate, etc., as a third component in addition to ethylene as a second component.

The amount of the third component is not critical. In general, this amount is not more than 20% by weight, preferably 5 to 15% by weight.

The epoxy group-containing copolymer can be prepared by various methods. It is possible to employ a random copolymerization method comprising introducing an unsaturated epoxy compound into the main chain of the copolymer and a graft copolymerization method comprising introducing an unsaturated epoxy compound as a branch for the copolymer. Specific examples of the preparation method are a method which comprises copolymerizing an unsaturated epoxy compound and ethylene in the presence of a radical-generating agent at 500 to 4,000 atmospheric pressures at 100° to 300° C. in the presence or absence of a suitable solvent and a chain transfer agent, a method which comprises mixing a polypropylene with an unsaturated epoxy compound and a radical-generating agent and subjecting the resultant mixture to melt graft polymerization in an extruder, and a method which comprises copolymerization an unsaturated epoxy compound and an ethylenically unsaturated compound in an inert medium such as water or an organic solvent in the presence of a radical-generating agent.

When the thermoplastic resin composition of the present invention is produced, a basic compound (J) may be co-present in order to promote the reaction between an unsaturated carboxylic acid or the derivative thereof having been graft polymerized to the modified polypropylene (A) or (B), to the modified polypropylene (A') or (B') or to a rubbery substance (I) and the epoxy group of the epoxy group-containing copolymer (G), and the reaction between the unreacted terminal carboxylic acid of the thermoplastic copolymer (E) containing an acid anhydride moiety of a six-membered ring and the epoxy group of the epoxy group-containing copolymer (G).

The co-presence of the basic compound (J) can shorten the reaction time and shorten the time required for the production. For example, organic amine compounds such as benzyldimethylamine, 2,4,6-tris(dimethylaminomethyl)phenol, etc., are preferred as the basic compound (J).

In the production of the thermoplastic resin composition, the above basic compound may be mixed with the starting materials for the thermoplastic resin composition, or it may be preliminary mixed with a portion of the starting materials or with a resin compatible with the thermoplastic resin composition so as to prepare a high-concentration master batch.

The rubber substance (H) used to improve the impact resistance, low-temperature impact resistance in particular, can be selected from ethylene copolymer rubbers, propylene-butene rubbers, isoprene-butylene rubbers, polyisoprenes, polybutadienes, styrene block copolymers such as styrene-butadiene rubbers, styrenebutadiene-styrene block copolymers, partially hydrogenated styrene-butadiene block copolymers, styreneisoprene block copolymers, partially hydrogenated styrene-isoprene block copolymers, etc., linear low-density polyethylenes, and mixtures of these.

Examples of the ethylene copolymer rubbers are various ethylene copolymer rubbers such as ethyleneα-olefin copolymer rubbers or ethylene-α-olefinnonconjugated diene copolymer rubbers typical examples of which are ethylene-propylene copolymer rubbers (hereinafter EPM) and ethylene-propylene-nonconjugated diene copolymer rubbers (hereinafter EPDM), ethylenevinyl acetate copolymers, ethylene-methyl acrylate copolymers, ethylene-methyl methacrylate copolymer rubbers, ethylene-ethyl acrylate copolymers, ethylene-ethyl methacrylate copolymers, ethylene-butyl acrylate copolymers, ethylene-butyl methacrylate copolymers, ethylene-acrylic acid copolymers, ethylene-methacrylic acid copolymers, copolymers of a partial metal salt of ethylene-acrylic acid, copolymers of a partial metal salt of ethylene-methacrylic acid, ethylene-acrylic acid-acrylic ester terpolymers, ethylene-acrylic acid-methacrylic ester terpolymers, ethylene-methacrylic acid-acrylic ester terpolymers, ethylene-methacrylic acid-methacrylic ester terpolymers, ethylene-vinyl alcohol copolymers, ethylene-vinyl acetate-vinyl alcohol terpolymers, ethylene-styrene copolymers, etc. And, these ethylene copolymer rubbers can be used in combination. Further, these ethylene copolymer rubbers can be used by mixing them with a low-density or high-density polyethylene which is well compatible with these. The modified rubbery substance (I) is obtained by graft-polymerizing an unsaturated carboxylic acid or the derivative thereof, or an unsaturated carboxylic acid or the derivative thereof and an unsaturated aromatic monomer, onto the above rubbery substance (H), if necessary, in the co-presence of a radical initiator, or alternatively by introducing an unsaturated carboxylic acid or the derivative thereof, or a mixture of an unsaturated carboxylic acid or the derivative thereof with an unsaturated aromatic monomer, into the α-olefin main chain in the presence of a polymerization initiator and a catalyst.

The starting rubbery material for the rubbery substance (H) and the modified rubbery substance (I) can be particularly suitably selected from ethylene copolymers and styrene block copolymers.

Of the ethylene copolymer rubbers, particularly preferred are ethylene-α-olefin copolymer rubbers and ethylene-α-olefin nonconjugated copolymer rubbers. Examples of the ethylene-α-olefin copolymer rubbers include copolymers of ethylene and another α-olefin such as propylene, 1-butene, 1-pentene, 1-hexene, 4-methyl-1-pentene, 1-octene, or the like, and terpolymer rubbers such as an ethylene-propylene-1-butene terpolymers. Of these, ethylene-propylene copolymer rubbers and ethylene-1-butene copolymer rubbers are preferred.

Further, ethylene-α-olefin-nonconjugated diene terpolymer rubbers can be also used. However, it is preferable to adjust the nonconjugated diene content in the starting material rubber to not more than 3% by weight. When the nonconjugated diene content exceeds 3% by weight, there are some cases where the composition undesirably undergoes gelation when it is kneaded.

The ethylene content in the ethylene-α-olefin copolymer rubber is usually 15 to 85% by weight, preferably 40 to 80% by weight. That is, there are some cases where a highly crystalline polymer having an ethylene content of more than 85% by weight is difficult to process under ordinary rubber-forming conditions, and that having an ethylene content of less than 15% by weight is liable to show an increase in glass transition temperature (Tg) and undesirably lose rubber properties.

The number average molecular weight of the ethylene-α-olefin copolymer rubber preferably falls within the range which permits kneading in an extruder and it usually of from 10,000 to 100,000. When the molecular weight is too low, the feeding of the ethylene-α-olefin copolymer rubber to an extruder tends to be difficult, and when it is too high, there are some cases where the ethylene-α-olefin copolymer rubber shows a low fluidity and tends to cause difficulty in processing.

The molecular weight distribution of the ethylene-α-olefin copolymer rubber is not critical. Usually, there can be used any of conventionally manufactured and commercially available copolymer rubbers having a variety of molecular weight distributions such as a monomodal distribution and a bimodal distribution.

The Q value (weight average molecular weight/number average molecular weight) of the molecular weight distributions is preferably in the range of 1 to 30, more preferably 2 to 20.

In summary, the copolymer rubber is that which is produced in the presence of the so-called ZieglerNatta catalyst, i.e. a catalyst conventionally used for the production. For example, a combination of an organoaluminum compound with a trivalent to pentavalent vanadium compound soluble in a hydrocarbon solvent is used as a Ziegler-Natta catalyst. The aluminum compound can be selected from alkylaluminum sesquichloride, trialkylaluminum, dialkylaluminum monochloride, and mixtures of these. The vanadium compound can be selected from vanadium oxytrichloride, vanadium tetrachloride and a vanadate compound of the formula VO-$(OR^8)_q X_{3-q}$ wherein $0 < q \leq 3$, $R^8$ is a linear, branched or cyclic hydrocarbon having 1 to 10 carbon atoms, and X is a halogen selected from Cl, Br and I.

Of the styrene block copolymers, particularly preferred are partially hydrogenated styrene-butadiene block copolymers. The partially hydrogenated styrene-butadiene block copolymer is produced by partial hydrogenation of a styrene-butadiene block copolymer. The structure and production process thereof are described below.

The number average molecular weight of the copolymer rubber block in the partially hydrogenated styrene-butadiene block copolymer is usually 10,000 to 1,000,000, preferably 20,000 to 300,000. The number average molecular weight of the unsaturated aromatic copolymer block in the partially hydrogenated styrene-butadiene block copolymer is usually 1,000 to 200,000, preferably 2,000 to 100,000. The number average molecular weight of the nonconjugated diene copolymer block in the partially hydrogenated styrene-butadiene block copolymer is usually 1,000 to 200,000, preferably 2,000 to 100,000. And the weight ratio of the unsaturated aromatic copolymer block to the nonconjugated diene copolymer block is usually 2 : 98 to 60 : 40, preferably 10 : 90 to 40 : 60.

Many processes have been proposed for the production of the block copolymer rubber. A typical process is disclosed in Japanese Patent Publication Kokoku No.

40-23798, in which a block copolymer rubber of an unsaturated aromatic hydrocarbon and a diene hydrocarbon can be produced by block copolymerization in an inert solvent in the presence of a lithium catalyst or a Ziegler catalyst.

Such a block copolymer rubber is hydrogenated in an inert solvent in the presence of a hydrogenation catalyst, e.g. according to any one of the methods disclosed in Japanese Patent Publications Kokoku Nos. 42-8704, 43-6636 and 46-20814. The hydrogenation in this case is carried out in such a way that the hydrogenation ratio of the polymer block B is usually at least 50%, preferably 80% or more and that the hydrogenation ratio of the aromatic unsaturated bond in the unsaturated aromatic polymer block is not more than 25%. One typical example of such a partially or completely hydrogenated block copolymer is on the market in the trade name KRATON®-G, supplied by Shell Chemical Co., U.S.A.

In the production of the modified rubbery substance (I), the method for graft-copolymerizing a graft monomer to the rubbery substance can be selected from a variety of known methods.

For example, the graft copolymerization is carried out by a method which comprises mixing a starting rubbery substance, a graft monomer and a radical initiator and melt-kneading the mixture in a melt-kneading apparatus to effect grafting, or a method which comprises dissolving an ethylene copolymer rubber in an organic solvent such as xylene, adding thereto a radical initiator under a nitrogen atmosphere, allowing the mixture to react under heat with stirring, cooling the reaction mixture after the reaction, washing the reaction product, filtering it and drying it thereby to obtain a grafted ethylene copolymer rubber. In addition to these, there are a method which comprises irradiating an ethylene copolymer rubber with ultraviolet light or radiation in the presence of a graft monomer, and a method which comprises bringing a rubbery substance into contact with oxygen or ozone.

In view of economical benefit, it is most preferred to employ a graft copolymerization method in which the above materials are melt-kneaded in a melt-kneading apparatus.

In the present invention, the modified rubbery substance (I) can be obtained by melt-kneading the starting rubbery substance with an unsaturated carboxylic acid or the derivative thereof in the optional copresence of a radical initiator, or by melt-kneading the starting rubbery substance with an unsaturated carboxylic acid or the derivative thereof and an unsaturated aromatic monomer in the optional co-presence of a radical initiator, with an extruder, Banbury mixer, kneader, or the like, usually at a temperature of 200° to 280° C., preferably 230° to 260° C. usually for a residence time, which varies depending upon the radical initiator, of 0.2 to 10 minutes.

The presence of too large an amount of oxygen during the kneading sometimes results in formation of a gel or serious coloring. Therefore, the kneading is carried out desirably in the substantial absence of oxygen.

When the kneading temperature is lower than 200° C., there are some cases where it is difficult to graft the unsaturated carboxylic acid anhydride in such an amount as desired, and the effect on improvement in the degree of the graft reaction tends to be small. When the kneading temperature is higher than 280° C., the effect on improvement in the degree of the graft reaction tends to be small, and undesirably in some cases, formation of a gel, coloring, etc., are liable to occur.

The kneading machine for the modification is not critical. Usually, an extruder is preferred since it permits continuous production, and more preferred is an extruder having a single screw or twin screw suitable for homogeneously kneading the starting materials.

In order to remove unreacted components (an unsaturated carboxylic acid or the derivative thereof, an unsaturated aromatic monomer, a radical initiator, etc.) and by-products such as oligomers and decomposition products thereof from the reaction product, the reaction product can be purified by effecting vacuum pump-suction through vent lines halfway along the extruder or in a place near its outlet, or alternatively by dissolving the reaction product in a suitable solvent to precipitate it. The reaction product can be also subjected to heat treatment at a temperature of not less than 60° C and vacuuming while it is in a molten state.

The above three or four components may be separately fed to a kneading machine, or alternatively, some or all of these components may be uniformly mixed in advance of feeding them. Example, it is possible to employ a kneading method which comprises preliminarily impregnating a rubber with both a radical initiator and an unsaturated aromatic monomer, feeding the resulting rubber and an unsaturated carboxylic acid or the derivative thereof to an extruder at the same time and kneading the resultant mixture. It is also possible to employ a modification method which comprises feeding a radical initiator and/or an unsaturated carboxylic acid or the derivative thereof and an unsaturated aromatic monomer halfway along an extruder.

A variety of additives may be optionally added to the modified rubbery substance (I) during the modification or post-treatment. Examples of such additives are antioxidants, heat stabilizers, light stabilizers, nucleating agents, lubricants, antistatic agents, inorganic or organic colorants, rust preventives, crosslinking agents, foaming agents, plasticizers, fluorescent agents, surface treating agents, surface brighteners, etc.

The unsaturated carboxylic acid or the derivative thereof and radical initiator to obtain the modified rubbery substance (I) can be selected from those compounds used for the production of the modified polypropylene (A), etc. As an unsaturated aromatic monomer, styrene is most preferred. The unsaturated aromatic monomer can be also selected from o-methylstyrene, p-methylstyrene, α-methylstyrene, vinyltoluene and divinylbenzene. These may be used in combination.

In the production of the modified rubbery substance (I), the unsaturated aromatic monomer is used to prevent gel formation and improve the graft reaction degree. Per 100 parts by weight of the starting rubbery substance, the amount of the unsaturated aromatic monomer is preferably 0.2 to 20 parts by weight, and the amount of the unsaturated carboxylic acid or the derivative thereof is preferably 0.5 to 15 parts by weight. When the unsaturated aromatic monomer is also used, the amount of the unsaturated carboxylic acid or the derivative thereof is preferably 0.5 to 15 parts by weight, and the weight ratio of the unsaturated aromatic monomer to unsaturated carboxylic acid or the derivative thereof is preferably 0.1 to 3.0, more preferably 0.5 to 2.0.

When the weight ratio of the unsaturated aromatic monomer to the unsaturated carboxylic acid or the derivative thereof is less than 0.1, there are some cases where no effect is observed on prevention of gel formation and improvement in the graft reaction degree. Even when the above weight ratio exceeds 3.0, there are some cases where no further effect can be expected.

The amount used of the radical initiator depends on its kind and kneading conditions. In general, it can be used in an amount of 0.005 to 1.0 part by weight, preferably 0.01 to 0.5 part by weight per 100 parts by weight of the rubber as a starting rubber material. When the amount of the radical initiator is less than 0.005 part by weight, there are some cases where the unsaturated carboxylic acid or the derivative thereof is not grafted in an amount as described, and the effect of combined use of the unsaturated aromatic monomer on an increase in an amount of the grafted unsaturated carboxylic acid or the derivative thereof is sometimes small. When the above amount exceeds 1.0 part by weight, gel formation is, undesirably, liable to occur.

The modified rubbery substance (I) obtained above generally contains 0.1 to 5% by weight of the grafted unsaturated carboxylic acid or the derivative thereof and preferably contains 0.1 to 5% by weight of the grafted unsaturated aromatic monomer. The Mooney viscosity ($ML_{1+4}121°$ C.) thereof is preferably 5 to 120.

The modified rubbery substance (I) is also produced by another method in which the unsaturated carboxylic acid or the derivative thereof is introduced into the main chain of the starting rubber material by copolymerization in the presence of a polymerization initiator and a catalyst. In general, the modified rubbery substance can be produced by the following known high-pressure radical copolymerization method. That is, it can be produced by copolymerizing ethylene and a radical-polymerizable monomer (comonomer) in the presence of a free radical-generating agent such as organic peroxide, oxygen, etc. The copolymerization is usually carried out at a polymerization temperature of 130° to 300° C. under a polymerization pressure of 500 to 3,000 kg/cm2.

The radical-copolymerizable monomer can be selected from unsaturated carboxylic acids such as acrylic acid, methacrylic acid, etc. or esterification products thereof, vinyl esters such as vinyl acetate, etc., and the like. Specific examples of the esterification products of unsaturated carboxylic acids are methyl acrylate, ethyl acrylate, methyl methacrylate, glycidyl methacrylate, etc. These comonomers can be used alone or in combination.

The comonomer content in the modified rubbery substance (I) directly copolymerized is usually 0.1 to 40% by weight, preferably 1 to 35% by weight. When the comonomer content is less than 0.1% by weight, there are some cases where no effect of the modification is obtained.

Those specified as examples of the ethylene copolymer rubber of the starting rubbery substance for the rubbery substance (H) and the modified rubbery substance (I) are excluded from the scope of these copolymers. Of these, an ethylene-acrylic acid copolymer and an ethylene-methacrylic acid copolymer are preferred.

Each of the modified polypropylene resin compositions (A') and (B') is produced by co-modifying a polypropylene and a rubbery substance as starting materials by adding an unsaturated carboxylic acid or the derivative thereof or a mixture of an unsaturated carboxylic acid or the derivative thereof with an unsaturated aromatic monomer.

That is, the modified polypropylene resin compositions (A') and (B') can be produced according to a similar method to those described concerning the production of the modified polypropylenes (A) and (B) or the modified rubbery substance (I), respectively. The polypropylene and the rubbery substance as starting materials can be co-modified by allowing them to be co-present and graft-copolymerizing an unsaturated carboxylic acid or the derivative thereof or a mixture of an unsaturated carboxylic acid or the derivative thereof with an unsaturated aromatic monomer to them optionally in the presence of a radical initiator.

The polypropylene and an ethylene copolymer rubber as starting materials are allowed to be co-present as follows according to various known methods. When these two starting materials are pellets, powders or pulverized products, these materials are fed into an extruder separately or through the same feed port to allow them to be co-present in the apparatus, or these materials are preliminarily uniformly mixed by means of a simple mixing device such as a tumbler, Henschel mixer, etc. When either of these materials is a large solid in a bale form, etc., they are preliminarily melt-kneaded and homogenized with a batch melt-kneading apparatus such as a roll, a kneader, a Banbury mixer, etc., and further, pelletized or pulverized so that it ca be easily fed to a co-modifying apparatus.

Steps other than the step of allowing the polypropylene and the rubbery substance as starting materials to be co,-present can be carried out in the same manner as those used for the production of the modified polypropylenes (A) and (B) or for the production of the modified rubbery substance (I), whereby the above materials are co-modified.

In the above co-modification, the proportions of the polypropylene and the rubbery substance as starting materials can be freely selected. However, it is preferable to determine the proportions thereof in view of the proportions of the modified polypropylenes (A) and (B) and the modified rubbery substance (I) in the thermoplastic resin composition of the present invention.

When the co-modification is carried out, the amount of the unsaturated carboxylic acid or the derivative thereof, per 100 parts by weight of the polypropylene and the rubbery substance in total, is preferably 0.01 to 20 parts by weight, more preferably 0.1 to 5 parts by weight, and the amount of the radical initiator, if necessary, is preferably at most 5 parts by weight, more preferably 0.001 to 2 parts by weight.

In order to disperse the polypropylene and the rubbery substance as starting materials while dynamically co-modifying them, it is preferable to use a highly efficient melt-kneading apparatus such as a highly efficient twin-screw extruder, etc.

The amount of the unsaturated carboxylic acid or the derivative thereof which is grafted on the modified polypropylene compositions (A') and (B') is not critical. It is usually 0.10 to 0.50% by weight, preferably 0.20 to 0.45% by weight. As the unsaturated carboxylic acid or the derivative thereof, maleic anhydride is preferred. The melt flow rate of each of the modified polypropylene compositions (A') and (B') is not critical. It is usually 0.1 to 100 g/minute, preferably 5 to 50 g/10 minutes. The amount of the unsaturated aromatic monomer grafted in the modified polypropylene composition (B') is not critical. It is usually less than 0.5% by weight, preferably 0.1 to 0.3% by weight. As an unsaturated aromatic monomer, styrene is preferred.

In thermoplastic resin composition of the present invention, one of preferred embodiments is a composite material which is obtained by further incorporating thereinto a flame-retardant or flame retardant auxiliary, a lubricant, a nucleating agent, a plasticizer, a dye, a pigment, an antistatic agent, an antioxidant, a weatherability-imparting agent, etc.

In the thermoplastic resin composition of the present invention, the resin composition (F) usually contains 1 to 99% by weight, preferably 5 to 95% by weight of the modified polypropylene-based resin composition (D) or (D') as a first component. When the above content is less than 1% by weight, there are some cases where the resultant thermoplastic resin composition is not sufficient in moldability, toughness, water resistance, chemical resistance, etc.

When the modified polypropylene-based resin composition (D) or (D') is a mixture composition of either the modified polypropylenes (A) or (B) and a polypropylene (C) or a mixture composition of either the modified polypropylene compositions (A') or (B') and a polypropylene (C), the content of the modified polypropylene (A) or (B) or the content of the modified polypropylene composition (A') or (B') in the composition is preferably not less than 5% by weight. When this content is less than 5% by weight, the final resin composition tends to have a problem in compatibility and dispersibility, and it is sometimes difficult to obtain sufficient toughness and impact resistance. The improvement in the coatability and printability tends to be insufficient, either.

The resin composition (F) contains 99 to 1% by weight, preferably 95 to 5% by weight, more preferably 80 to 5% by weight of the thermoplastic copolymer (E) containing an acid anhydride moiety of six-membered ring. The thermoplastic copolymer (E) containing an acid anhydride moiety of six-membered ring produces an effect on improvement in heat resistance, stiffness, etc. When the amount of the thermoplastic copolymer containing an acid anhydride moiety of six-membered rings less than 1% by weight, no desirable effect can be obtained on the heat resistance, stiffness, etc. When this amount exceeds 99% by weight, undesirably, the resultant thermoplastic resin composition shows a low impact resistance and fluidity, and its specific gravity increases.

The amount of the epoxy group-containing copolymer (G), per 100 parts by weight of the thermoplastic composition (F) consisting of the modified polypropylene resin-based composition (D) or (D') and the thermoplastic copolymer containing an acid anhydride moiety of six-membered ring, is 0.1 to 300 parts by weight, preferably 1 to 200 parts by weight. When this amount is less than 0.1 part by weight, the resulting resin compositions causes problems on compatibility and dispersibility, and the resultant thermoplastic resin composition is insufficient in toughness and impact resistance and poor in extrusion stability. When it is more than 100 parts by weight, the resultant thermoplastic resin composition is useful as a thermoplastic elastomer, but when it is more than 300 parts by weight, the resultant thermoplastic resin composition shows a considerable decrease in toughness, heat resistance, etc., and no desirable result is obtained.

The amount of the rubbery substance (H) and/or the modified rubbery substance (I) used to improve the low-temperature impact resistance is 0.1 to 300 parts by weight, preferably 1 to 200 parts by weight per 100 parts by weight of the resin composition (F) consisting of the modified polypropylene-based resin composition (D) or (D') and the thermoplastic copolymer (E) containing an acid anhydride moiety of six-membered ring. When this amount is less than 0.1 part by weight, no effect is produced on the improvement in impact resistance. When it is more than 100 parts by weight, the resultant thermoplastic resin composition is useful as a thermoplastic elastomer, but when it is more than 300 parts by weight, the resultant thermoplastic resin composition shows a considerable decrease in toughness, heat resistance, etc., and no desirable result is obtained.

The amount of the basic compound (J) optionally used as a reaction promoter is not more than 5 parts by weight, preferably 0.01 to 2 parts by weight per 100 parts by weight of the resin composition (F) consisting of the modified polypropylene-based resin composition (D) or (D') and the thermoplastic copolymer (E) containing an acid anhydride moiety of six-membered ring. When the kneading strength at a kneading time is sufficient and when the residence time within a kneader is sufficient to the reaction, it is not necessary to incorporate the basic compound (J). When more than 5 parts by weight of the basic compound (J) is incorporated, the reaction promotion effect is high. However, problems on an appearance of the resultant molded article and offensive odor tend to be serious due to bleeding, etc., and there are some cases where no desirable effect can be obtained.

The process for the production of the thermoplastic resin composition of the present invention is not critical, and conventionally known processes can be employed.

It may be effective to employ a process which comprises mixing the resin components in a solution state and evaporating a solvent or precipitating the resin composition in a non-solvent. From an industrial viewpoint, it is actually preferred to employ a process which comprises kneading the resin components in a molten state. The melt-kneading can be carried out by means of a variety of kneading apparatus such as a Banbury mixer, an extruder, a roll, a kneader, etc.

When the resin components are kneaded, it is preferable to preliminarily mix them all in a powder or pellet form uniformly with an apparatus such as a tumbler or a Henschel mixer. If necessary, however, it is possible to individually feed predetermined amounts of the resin components to a kneading apparatus without the preliminary mixing.

When a powder or a master batch of the basic compound (J) is used for reaction promotion, any one of the above methods can be adopted. When the basic compound (J) is a liquid, it is preferred to preliminarily mix the basic compound with the resin components by means of a tumbler or a Henschel mixer. Further, it is also possible to employ a method in which a kneading apparatus is provided with a quantitative pump and the liquids are added through a tube.

The kneaded resin composition is molded by various molding methods such as injection molding, extrusion molding, etc. The articles made of the thermoplastic resin composition of the present invention also includes articles obtained by a method for producing a molded article, which comprises dry-blending the starting materials at the time of injection molding or extrusion molding without carrying out a preliminary mixing step, and directly kneading the resultant composition during melt processing.

In the present invention, the kneading order is not critical. Some of its embodiments are shown below.

(1) The modified polypropylene (A) or the modified polypropylene composition (A'), the polypropylene (C), the thermoplastic copolymer (E) containing an acid anhydride moiety of six-membered ring, the epoxy group-containing copolymer (G), the rubbery substance (H) and/or the modified rubbery substance (I), and optionally, the basic compound (J) are kneaded in one lot.

(2) The modified polypropylene-based resin composition (D) or (D') is preliminary prepared by kneading the modified polypropylene (A) and the polypropylene (C), or the modified polypropylene composition (A') and the polypropylene (C). Thereafter, the thermoplastic copolymer (E) containing an acid anhydride moiety of six-membered ring, the epoxy group-containing copolymer (G), the rubbery substance (H) and/or the modified rubbery substance (I) and optionally the basic compound (J) are incorporated, and the resultant mixture is kneaded.

(3) The modified polypropylene-based resin composition (D) or (D') and the thermoplastic copolymer (E) containing an acid anhydride moiety of six-membered ring are preliminarily kneaded. Thereafter, the epoxy group-containing copolymer (G), the rubbery substance (H) and/or modified rubbery substance (I) and optionally the basic compound (J) are incorporated, and the resultant mixture is kneaded. Besides the above methods, other kneading orders may be possible. However, when the modified polypropylene (A) or the modified polypropylene composition (A') and the epoxy group-containing copolymer (G) are preliminarily kneaded, when the epoxy group-containing copolymer (G) and the modified rubbery substance (I) are preliminary kneaded, or when the thermoplastic copolymer (E) containing an acid anhydride moiety of six-membered ring and the epoxy group-containing copolymer (G) are preliminarily kneaded, a gel is sometimes formed depending upon proportions of these two components. In such a case, it is necessary to select suitable proportions of these two components properly before kneading them.

In order to simplify the kneading step, the step for preliminarily producing the modified polypropylene composition (A') or (B') may be integrated into the step for kneading the thermoplastic resin composition of the present invention.

That is, the thermoplastic resin composition of the present invention may be produced by a process comprising the first step of co-modifying a polypropylene and a rubbery substance as starting materials, and the second step of charging the polypropylene (C), the thermoplastic copolymer (E) containing an acid anhydride moiety of six-membered ring, the epoxy group-containing copolymer (G) and optionally the basic compound (J) to a site where the co-modified components are in a molten state.

In order to produce the thermoplastic resin composition of the present invention more effectively, it is preferred to use a highly efficient twin-screw extruder having a high L/D ratio and two or more feed ports. That is, the materials for the co-modification are charged through a first feed port, and sufficiently co-modified until other components than the modified polypropylene composition (A') or (B') are charged through a next feed port, and then, the other components are charged through a second feed port to knead the resultant mixture, whereby the composition can be efficiently produced.

The modified polypropylenes (A) and (B) can be also produced in the same manner as above.

In order to allow further improve the physical properties of the thermoplastic resin composition of the present invention, a variety of kneading methods can be employed. For example, in order to obtain an excellent impact resistance, it is possible to employ a method comprising kneading a portion of the epoxy group-containing copolymer (G) with the thermoplastic copolymer (E) containing an acid anhydride moiety of six-membered ring and incorporating the remaining components thereto. In order to obtain an efficient reaction promotion effect of the basic compound (J), it is possible to employ a method comprising dispersing a high concentration of the basic compound (J) in one component which constitutes the thermoplastic resin composition of the present invention or a resin which is compatible with the thermoplastic resin composition, and incorporating the resultant master batch into the other components and kneading the resulting mixture.

The thermoplastic resin composition of the present invention can easily give a molded article by molding it according to a conventional molding or forming method such as injection molding, extrusion molding, compression molding, blow molding, roll molding, lamination molding, vacuum forming, pressure molding, or the like. The present invention also includes the articles obtained by a method for producing a molded article, which comprises dry-blending the above components at the time of injection molding or extrusion molding without carrying out the preliminary mixing step, and directly kneading the resultant composition during melt processing.

Of the above molding and forming methods, injection molding is preferred from the viewpoint of productivity, etc. A molded article is obtained by preliminarily drying a pelletized composition in a vacuum dryer, a hot air dryer, etc., and injection-molding the composition under predetermined conditions including injection rate, injection time, cooling temperature, etc.

Molded articles produced from the thermoplastic resin composition of the present invention are used as automobile parts, electric and electronic parts, etc. Examples of the automobile parts are exterior fittings such as a bumper, a fender, an apron, a hood panel, a facia, a locker panel, a locker panel reinforce, a floor panel, a rear quarter panel, a door panel, a door support, a roof top, a trunk lid, etc., interior fittings such as a instrumental panel, a console box, a glove box, a shift knob, a pillar garnish, a door trim, a steering wheel, an arm rest, a window roover, a carpet, a head rest, a seat belt, a seat, etc., internal fittings in an engine room such as a distributor cap, an air cleaner, a radiator tank, a battery case, a radiator shroud, a washer tank, a cooling fan, a heater case, etc., a mirror body, a wheel cover, a trunk trim, a trunk mat, a gasoline tank, and the like.

Of the above molded articles used as an automobile part, the thermoplastic resin composition of the present invention is particularly suitably usable for a bumper and a fender of which excellent stiffness and low-temperature impact resistance are required.

The present invention will be explained hereinafter by reference to Examples, which exemplifies the present invention but shall not limit the present invention.

Methods for measuring the physical properties in Examples are as follows.

(1) Melt flow rate

Measured according to the method specified in JIS K 6758. The measurement temperature was 230° C., and the load was 2.16 kg unless otherwise specified.

(2) Tensile test

Carried out according to the method specified in ASTM D638. A test piece having a thickness of 3.2 mm was measured for a tensile yield strength and a tensile elongation. The measurement temperature was 23° C. unless otherwise specified.

(3) Flexural test

Carried out according to the method specified in JIS K 7203. A test piece having a thickness of 3.2 mm was measured for a flexural modulus and a flexural strength at a span length of 50 mm at a loading rate of 1.5 mm/minute. The measurement temperature was 23° C. unless otherwise specified. When the test was carried out at a temperature other than 23° C., a sample was conditioned in a constant-temperature bath at a predetermined temperature for 30 minutes before the measurement.

(4) Izod impact strength

Measured according to the method specified in JIS K 7110. A test piece having a thickness of 3.2 mm was measured for a notched impact strength. The measurement temperature was 23° C. unless otherwise specified. When the measurement was carried out at a temperature other than 23° C., a sample was conditioned in a constant-temperature bath at a predetermined temperature for 2 hours before the measurement.

(5) Penetration impact strength

A high rate impact tester (RIT-8000), supplied by Rheometric Inc. (USA)) was used. A deformation degree and stress of a flat test piece having a thickness of 3 mm were detected by fixing the test piece with a 2-inch circular holder and hitting a ⅝-inch impact probe (tip spherical surface: 5/16 inch radius) against the test piece at a rate of 3 m/second, thereby to draw a curve as shown in FIG. 1. The penetration impact strength was evaluated by integrating the area along the curve.

BRIEF DESCRIPTION OF DRAWING

FIG. 1 shows one example of measurement charts in evaluation of penetration impact strength, in which the abscissa axis indicates a displacement amount (D: mm) showing deformation of the test piece and the ordinate axis indicates a stress (N: newton) to the displacement amount. Both of these values were continuously detected and continuously plotted in an X-Y plotter whereby said measurement chart was obtained.

A yield point energy was obtained by integrating areas of the deformation amount and the stress from a start of stress detection to a yield point of a material, and a total energy was obtained by integrating areas of the displacement amount and the stress from a start portion to a breaking point.

The fracture state of a material was determined to be ductile fracture (D) or brittle fracture (B) by observing a test piece actually subjected to a fracture test.

An energy value required for yield of a material was evaluated in terms of energy at a yield point, and an energy value required for fracture of a material was evaluated in terms of total energy. These values are expressed in a unit of joule (J).

A sample was conditioned in a constant-temperature bath attached to the apparatus. A test piece was placed in the constant temperature bath adjusted to a predetermined temperature and conditioned for 2 hours before the above test. The predetermined temperature was used as a measurement temperature.

(6) Heat distortion temperature

Measured according to the method specified in JIS K 7207. The fiber stress was measured at 4.6 kg/cm$^2$.

(7) Rockwell hardness

Measured according to the method specified in HIS K 7207. The thickness of a test piece was 3.2 mm, R was used as a steel ball, and the evaluation value was expressed on R scale.

(8) Graft amount of maleic anhydride and styrene

The graft amount of maleic anhydride on each of the modified polypropylenes (A) and (B) and the modified polypropylene compositions (A') and (B') was determined by dissolving a small amount of a sample in hot xylene, forming a precipitate with anhydrous acetone to purify the sample, then redissolving the purified sample in xylene, and titrating the resultant solution with a methanol solution of NaOH while the solution was under heat (110° to 120° C.) and phenolphthalein was used as an indicator.

The graft amount of the maleic anhydride in the modified rubbery substance (I) was determined by dissolving a small amount of a sample in toluene, forming a precipitate with anhydrous acetone to purify the sample, then redissolving the purified sample in toluene, and titrating the resultant solution with an ethanol solution of KOH while the solution was under heat (85° C.) and phenolphthalein was used as an indicator.

The graft amount of styrene was determined on the basis of intensity of an absorption peak derived from substituted benzene rings observed in an infrared absorption spectrum of the above purified sample.

(9) Mooney viscosity

Measured according to the method specified in JIS K 6300. The measurement temperature was 121° C.

(10) Number average molecular weight

Measured by gel permeation chromatography (GPC) under the following conditions.
GPC: type 150C, supplied by Waters.
Column: Shodex 80 MA, supplied by Showa Denko K.K.
Sample amount: 300μl (polymer concentration: 0.2 wt%)
Flow rate: 1 ml/min.
Temperature: 135° C.
Solvent: Trichlorobenzene A calibration curve for calculation of the number average molecular weight was prepared by a conventional method using standard polystyrene supplied by Tohsoh Corp. A data processor CP-8 Model III supplied by Tohsoh Corp. was used for data processing.

(11) Ethylene content

The ethylene content was determined by preparing a press sheet, measuring it for an infrared absorption spectrum, and using a calibration curve from absorbances of characteristic absorptions of methyl (—CH₃) and methylene (—CH₂—) which were observed in the infrared absorption spectrum.

Referential Example 1

Preparation of modified polypropylene (1) M-PP-1

A modified polypropylene (A) was prepared in the following manner. A propylene homopolymer, as a starting material, prepared by a slurry polymerization method according to the process described in JP-A-60-28405, which had a melt flow rate of 1.3 g/10 minutes, an intrinsic viscosity, measured in tetralin at 135° C., of 2.45 dl/g, a 20° C. cold xylene soluble of 2.9% by weight, a boiling heptane soluble of 6.7% by weight, and an isotactic pentad, in its boiling heptane-insolubee portion, of 0.952 was modified in the following manner.

100 Parts by weight of the propylene homopolymer as a starting material, 1.0 part by weight of maleic anhydride, 0.6 part by weight of a radical initiator prepared by allowing a propylene homopolymer to support 8% by weight of 1,3-bis(t-butylperoxyisopropyl)benzene (Sanperox ®-TY1.3 supplied by Sanken Kako Co., Ltd.) and 0.1 part by weight of Irganox ® 1010 (supplied by Ciba Geigy Ltd.) as a stabilizer were uniformly mixed with a Henschel mixer. The resultant mixture was melt-kneaded with a twin-screw extruder, model TEX 44 SS-30BW-2V supplied by Japan Steel Works Ltd., at a temperature of 220° C. for an average residence time of 1.5 minutes to give a maleic anhydride-modified polypropylene (A) having a maleic anhydride graft amount of 0.08% by weight and a melt flow rate of 36 g/10 minutes. This modified polypropylene (A) is abbreviated as M-PP-1 hereinafter.

(2) MS-PP-1

A modified polypropylene (B) was prepared as follows. A propylene homopolymer, as a starting material, prepared by a slurry polymerization method according to the process described in JP-A-60-28405, which had the same structure as that in the above item (1) except for an isotactic pentad of 0.955, was modified in the same manner as in the above item (1) except that 0.5 part by weight of styrene was used in addition, whereby there was obtained a maleic anhydride- and styrene-modified polypropylene (B) having a maleic anhydride graft amount of 0.15% by weight, a styrene graft amount of 0.07% by weight and a melt flow rate of 21 g/10 minutes. This modified polypropylene (B) is abbreviated as MS-PP-1 hereinafter.

(3) MS-PP/EPR-1

A polypropylene and a rubbery substance were co-modified in the following manner. The same polypropylene as that used in the above item (1) was used in an amount of 77% by weight as a starting material, and 23% by weight of a pulverized ethylene-propylene copolymer rubber having a number average molecular weight of 55,000 and an ethylene content of 47% by weight was used as the rubbery substance.

The procedure as in the above item (1) was repeated except for the use of 1.5 parts by weight of maleic anhydride, 0.5 part by weight of styrene and 0.6 part by weight of a radical initiator per 100 parts by weight of the polypropylene as a starting material and the ethylene-propylene copolymer rubber in total, whereby there was obtained a co-modified polypropylene/rubbery substance having a maleic anhydride graft amount of 0.18% by weight, a styrene graft amount of 0.1% by weight and a melt flow rate of 11 g/10 minutes.

This co-modified polypropylene/rubbery substance is abbreviated as MS-PP/EPR-1 hereinafter.

(4) MS-PP/EPR-2

The same procedure for the production of a co-modified polypropylene/rubbery substance as in Referential Example 1-(3) was repeated except that the amounts of the polypropylene and rubbery substance as starting materials were changed to 69% by weight and 31% by weight, respectively, whereby there was obtained a co-modified polypropylene/rubbery substance having a maleic anhydride graft amount of 0.21% by weight, a styrene graft amount of 0.12% by weight and a melt flow rate of 9 g/10 minutes. This co-modified polypropylene/ rubbery substance is abbreviated as MS-PP/EPR-2 hereinafter.

(5) MS-PP/EPR-3

The same procedure for the production of a co-modified polypropylene/rubbery substance as in Referential Example 1-(3) was repeated except that an ethylene-butene-1 copolymer rubber having a number average molecular weight of 50,000 and an ethylene content of 82% by weight was used as a starting rubber substance in place of that used in Referential Example 1-(3), whereby there was obtained a co-modified polypropylene/rubbery substance having an maleic anhydride graft amount of 0.25% by weight, a styrene graft amount of 0.15% by weight and a melt flow rate of 11 g/10 minutes. This co-modified polypropylene/rubbery substance is abbreviated as MS-PP/EPR-3 hereinafter.

(6) MS-PP/SEBS-1

The same procedure for the production of a co-modified polypropylene/rubbery substance as in Referential Example 1-(3) was repeated except that a styrene-ethylene-butylene block copolymer having a number average molecular weight of 85,000, a styrene block of which the number average molecular weight was 50,000, an ethylene-styrene block of which the number average molecular weight was 35,000 and a styrene/ethylenebutylene block weight ratio of 30/70 (KRATON ®-G 1657, supplied by Shell Chemical) was used as a rubbery substance in place of that used in Referential Example 1-(3), whereby there was obtained a co-modified polypropylene/rubbery substance having maleic anhydride graft amount of 0.20% by weight and a melt flow rate of 13.1 g/10 minutes.

This co-modified polypropylene/rubbery substance is abbreviated as MS-PP/SEBS-4 hereinafter.

Referential Example 2

Preparation of modified rubbery substance

A modified rubbery substance (I) was prepared in the following manner. 100 Parts by weight of pellets of an ethylene-propylene copolymer rubber having a number average molecular weight of 60,000 and an ethylene content of 78% by weight, 2.0 parts by weight of maleic anhydride, 2.0 parts by weight of styrene and 1.0 part by weight of a radical initiator prepared by allowing a propylene homopolymer to support 8% by weight of 1,3-bis(t-butylperoxyisopropyl)benzene (Sanperox ®-TY1.3 supplied by Sanken Kako Co., Ltd.) were mixed with a Henschel mixer, and the resultant mixture was melt-kneaded in a twin-screw extruder, TEX 44 SS 30BW-2V, supplied by Japan Steel Works Ltd., under a nitrogen atmosphere at a kneading temperature of 250° C. and an extrusion rate of 18 kg/hour to give a modified ethylene-propylene copolymer rubber having a maleic anhydride graft amount of 1.5% by weight, a styrene graft amount of 0.8% by weight and a Mooney viscosity ($ML_{1+4}$ 121° C.), at 121° C., of 70. This modified ethylenepropylene copolymer rubber is abbreviated as MS-EPM-1 hereinafter.

Referential Example 3

Preparation of thermoplastic copolymer containing an acid anhydride moiety of six-membered ring 2.2 Liters of pure water and 2.4 g of hydroxycellulose were charged into a 5-liter autoclave having a stirrer, and dissolved. Thereafter, a prescribed amount of the monomers shown in Table 1, 6.4 g of lauryl mercaptan and 5.6 g of lauroyl peroxide were added, and the resultant mixture was polymerized at 80° C. for 1 hour and 40 minutes and further at 100° C. for 1 hour. And, the reaction mixture was washed, dehydrated and dried to give a particulate polymer.

100 Parts by weight of the above particulate polymer was mixed with 0.02 part by weight of sodium hydroxide with a Henschel mixer and the resultant mixture was granulated with an extruder equipped with a vent having a diameter of 40 mm (VS40-28, supplied by Tanabe Plastic Machinery) at a screw rotation rate of 50 rpm at a resin temperature of 290° C. to give colorless transparent pellets.

Table 1 shows melt flow indices and compositions of the pellets and physical properties of the articles obtained by injection-molding the pellets.

(1) Composition distribution of copolymer (i)(A) Copolymer

The amount of an acid anhydride moiety of six-membered ring is quantitatively determined by means of absorption at 1,760 $cm^{-1}$ inherent to the acid anhydride structure.

The amount of an unreacted methacrylic acid is calculated by deducting the amount of an acid anhydride moiety of six-membered ring from the amount of methacrylic acid charged.

The amounts of styrene and methyl methacrylate are calculated on the basis of charged amount ratios.

(2) Melt flow index (MI)

Measured according to ASTM D-1238 at 230° C. under a load of 3.8 kg.

(3) Physical properties of molded articles (i) Method for preparation of test piece A pelletized polymer was injection-molded with an injection molding machine (M140-SJ, supplied by Meiki Seisakusho) at an injection pressure of 80 kg/$cm^2$ and a resin temperature of 260° C.

(ii) Heat resistance

Measured for a heat deformation temperature (HDT) (° C.) according to ASTM D648.

The measurement was conducted at a fiber stress of 18.6 kg/$cm^2$ after a molded article had been annealed for 12 hours.

Referential Example 4

Preparation of epoxy group-containing copolymer (1) E-MA-GMA-1

An epoxy group-containing copolymer (F) was prepared in the following manner. A terpolymer having a melt flow rate of 21 g/10 minutes (at 190° C., load: 2.16 kg) and having a weight ratio among ethylene, methyl methacrylate and glycidyl methacrylate of 65 : 15 : 20 (% by weight) was prepared by a high-pressure radical polymerization method according to the process described in JP-A-47-23490 and JP-A-48-11888.

This epoxy group-containing copolymer is abbreviated as E-MA-GMA-1 hereinafter.

(2) E-VA-GMA-1

An epoxy group-containing copolymer (G) was prepared in the same manner as in Referential Example 4-(1). The resultant terpolymer had a weight ratio among ethylene, vinyl acetate and glycidyl methacrylate of 85 : 5 : 10 (% by weight) and a melt flow rate of 7 g/10 minutes (at 190° C., load: 2.16 kg). This epoxy group-containing copolymer is abbreviated as E-VA-GMA-1 hereinafter.

Example 1 and Comparative Example 1

Each of the components obtained in the manner shown in Referential Examples were mixed in the proportions shown in Table 2 and preliminarily mixed with a Henschel mixer. Then, the resultant mixture was melt-kneaded in a continuous twin-screw extruder having a triple flighted rotor and a kneading disk in each of two kneading zones of which one is located at a zone next to a first feed port and the other at a zone next to a second feed port (TEX 44 SS 30BW-2V, supplied by Japan Steel Works Ltd.) at an extrusion rate of 30 kg/hour at a resin temperature of 240° C. and a screw revolution rate of 350 rpm under vacuuming through vent holes, whereby a composition was obtained.

The above composition was dried with a hot air dryer at 120° C. for 2 hours, and injection-molded with an injection molding machine, IS150E-V supplied by Toshiba Machinery, at a molding temperature of 240° C. at a mold cooling temperature of 70° C. for an injection time of 15 seconds and a curing time of 30 seconds, whereby test pieces for evaluation were obtained.

The test pieces were evaluated on its physical properties according to the predetermined methods. Table 3 shows the results.

Table 3 shows that, as compared with the test piece obtained in Comparative Example 1 which piece contains no epoxy group-containing copolymer, the test piece of the present invention obtained in Example 1 has a remarkably improved Izod impact strength and penetration impact strength.

Examples 2–12 and Comparative Examples 2–5

A modified polypropylene obtained in the manner described in Referential Examples, a thermoplastic copolymer containing an acid anhydride moiety of six-membered ring, an epoxy-group containing copolymer and a modified rubbery substance were mixed in the proportions shown in Table 2, and a composition was obtained in the same manner as in Example 1. Test pieces were prepared in the same manner as in Example 1, and the test pieces were evaluated on their physical properties in the same manner as in Example 1. Table 3 shows the results.

Example 13

The same materials as in Example 3 and benzyldimethylamine (Sumicure®BD, supplied by Sumitomo Chemical Co., Ltd.) as a basic compound (J) which was a reaction promoter were mixed in the proportions as shown in Table 2, and a composition was obtained in the same manner as in Example 3. Test pieces were prepared in the same manner as in Example 3, and the test pieces were evaluated on their physical properties in the same manner as in Example 3. Table 3 shows the results.

The test pieces of the present invention obtained in Example 3, to which the basic compound (J) had not been incorporated, showed good physical properties. And, the test piece obtained in this Example, to which the basic compound (J) had been incorporated, has a further improved level of Izod impact strength and penetration impact strength.

The thermoplastic resin composition according to the present invention not only exhibits an excellent processability but also produces remarkable advantages in that it gives highly improved physical properties as compared to those expected from each polymer which constitutes the thermoplastic resin composition of the present invention.

The novel resin composition provided by the present invention can be easily processed into molded articles, films and sheets by a molding method generally used for thermoplastic resins such as injection molding, extrusion molding, etc., and can give products which have well-balanced properties among stiffness, heat resistance, impact resistance, scratch resistance, coatability, oil resistance, chemical resistance, water resistance, etc., and which are excellent in appearance uniformity and smoothness. The thermoplastic resin composition of the present invention is particularly suitable for use where well-balanced properties among heat resistance and impact resistance, low-temperature impact resistance in particular, are required.

TABLE 1

| Abbreviation of polymer | Amount of monomer (%) | | | Copolymer composition (wt %) | | | | MI | Physical properties of molded article | |
|---|---|---|---|---|---|---|---|---|---|---|
| | MMA | MAA | ST | MMA | MAA | Acid anhydride | ST | | HDT (°C.) | Water absorbing capacity (%) |
| PGA-1 | 1280 | 160 | 160 | 80 | 2 | 8 | 10 | 2.1 | 120 | 1.3 |
| PGA-2 | 1360 | 160 | 80 | 85 | 2 | 8 | 5 | 1.8 | 120 | 1.6 |
| PGA-3 | 1120 | 240 | 240 | 70 | 3 | 12 | 15 | 1.7 | 128 | 1.3 |
| PGA-4 | 720 | 320 | 560 | 44 | 6 | 16 | 34 | 1.5 | 135 | 1.2 |

Note:
MMA: Methyl methacrylate
MAA: Methacrylic acid
ST: Styrene
Acid anhydride: Acid anhydride moiety of six-membered ring from methacrylic acid

TABLE 2

| Component No. | Modified polypropylene | | Thermoplastic copolymer (E) containing acid anhyride moiety of six-membered ring | | Epoxy group - containing copolymer (G) | | Modified rubbery substance (I) | | Basic compound (J) |
|---|---|---|---|---|---|---|---|---|---|
| Example 1 | MPP-1 | 60 wt % | PGA-1 | 20 wt % | E-MA-GMA-1 | 2 wt % | MS-EPM-1 | 18 wt % | — |
| Example 2 | M-PP-1 | 60 | PGA-2 | 20 | E-MA-GMA-1 | 2 | MS-EPM-1 | 18 | — |
| Example 3 | MS-PP-1 | 60 | PGA-1 | 20 | E-VA-GMA-1 | 2 | MS-EPM-1 | 18 | — |
| Example 4 | MS-PP-1 | 60 | PGA-2 | 20 | E-VA-GMA-1 | 2 | MS-EPM-1 | 18 | — |
| Example 5 | MS-PP/EPR-1 | 78 | PGA-1 | 20 | E-MA-GMA-1 | 2 | — | | — |
| Example 6 | MS-PP/EPR-1 | 78 | PGA-3 | 20 | E-MA-GMA-1 | 2 | — | | — |
| Example 7 | MS-PP/EPR-1 | 78 | PGA-4 | 20 | E-MA-GMA-1 | 2 | — | | — |
| Example 8 | MS-PP/EPR-2 | 58 | PGA-1 | 40 | E-MA-GMA-1 | 2 | — | | — |
| Example 9 | MS-PP/EBR-3 | 78 | PGA-1 | 20 | E-MA-GMA-1 | 2 | — | | — |
| Example 10 | MS-PP/SEBS-4 | 78 | PGA-1 | 20 | E-MA-GMA-1 | 2 | — | | — |
| Example 11 | MS-PP-1 | 78 | PGA-1 | 20 | E-VA-GMA-1 | 2 | — | | — |
| Example 12 | MS-PP-1 | 55 | PGA-1 | 40 | E-VA-GMA-1 | 5 | — | | — |
| Example 13 | MS-PP-1 | 60 | PGA-1 | 20 | E-VA-GMA-1 | 2 | MS-EPM-1 | 18 | Sumicure ® BD 0.5 part |
| Comparative Example 1 | MS-PP-1 | 60 | PGA-1 | 20 | — | | MS-EPM-1 | 20 | — |
| Comparative Example 2 | MS-PP-1 | 60 | PGA-1 | 20 | — | | MS-EPM-1 | 20 | — |

TABLE 2-continued

| Component No. | Modified polypropylene | | Thermoplastic copolymer (E) containing acid anhyride moiety of six-membered ring | | Epoxy group - containing copolymer (G) | | Modified rubbery substance (I) | Basic compound (J) |
| --- | --- | --- | --- | --- | --- | --- | --- | --- |
| Comparative Example 3 | MS-PP-1 | 80 | PGA-1 | 20 | — | | — | — |
| Comparative Example 4 | MS-PP-1 | 60 | PGA-1 | 40 | — | | — | — |
| Comparative Example 5 | MS-PP-1 | 90 | — | | E-VA-GMA-1 | 10 | — | — |

TABLE 3

| Physical properties | Melt flow rate (g/10 minutes) | Tensile properties | | Flexural properties | | Izod impact strength | | Penetration impact strength (YE/TE)*1 −30° C. (J: joul) | Heat deformation temperature (° C.) | Rockwell hardness $H_R$ |
| --- | --- | --- | --- | --- | --- | --- | --- | --- | --- | --- |
| | | Strength at yield point (kg/cm²) | Elongation at break (%) | Elastic modulus (kg/cm²) | Strength (kg/cm²) | 23° C. (kg · cm/cm) | −30° C. (kg · cm/cm) | | | |
| Example 1 | 13.0 | 187 | >200 | 10,700 | 259 | 20 | 8.9 | 24/30 (D-B) | 114 | 66 |
| Example 2 | 9.7 | 184 | 150 | 10,500 | 256 | 18 | 7.8 | 21/28 (D-B) | 116 | 66 |
| Example 3 | 10.6 | 199 | >200 | 11,300 | 276 | 22 | 9.0 | 24/31 (D-B) | 115 | 67 |
| Example 4 | 8.0 | 196 | 140 | 11,000 | 274 | 20 | 7.9 | 22/29 (D-B) | 118 | 67 |
| Example 5 | 12.1 | 204 | >200 | 10,800 | 248 | 27 | 7.0 | 25/37 (D-B) | 105 | 66 |
| Example 6 | 13.2 | 183 | 80 | 11,600 | 272 | 19 | 4.5 | 22/25 (B) | 106 | 66 |
| Example 7 | 11.8 | 201 | 50 | 11,000 | 256 | 25 | 7.0 | 28/36 (D-B) | 104 | 67 |
| Example 8 | 4.6 | 188 | 40 | 11,000 | 232 | 15 | 5.6 | 24/26 (B) | 110 | 56 |
| Example 9 | 11.4 | 232 | 140 | 12,300 | 307 | 18 | 3.4 | 20/22 (B) | 109 | 81 |
| Example 10 | 15.8 | 177 | >200 | 8,600 | 218 | 25 | 7.4 | 30/43 (D-B) | 104 | 67 |
| Example 11 | 7.3 | 211 | >200 | 11,500 | 288 | 28 | 11.4 | 27/36 (D-B) | 120 | 73 |
| Example 12 | 12.5 | 332 | 60 | 16,100 | 484 | 6.4 | 3.4 | 1.5/2.1 (B) | 119 | 93 |
| Example 13 | 6.0 | 426 | 40 | 18,700 | 590 | 6.9 | 3.9 | 1.9/3.0 (B) | 121 | 91 |
| Comparative Example 1 | 17.8 | 240 | 20 | 12,200 | 340 | 3.2 | 1.9 | 0.5/1.3 (B) | 120 | 73 |
| Comparative Example 2 | 12.9 | 251 | 20 | 12,700 | 357 | 3.7 | 2.0 | 0.6/1.4 (B) | 121 | 74 |
| Comparative Example 3 | 13.4 | 390 | 15 | 17,900 | 551 | 2.4 | 1.9 | 0.1/0.2 (B) | 127 | 97 |
| Comparative Example 4 | 10.1 | 489 | 10 | 23,300 | 741 | 2.0 | 1.8 | 0.1/0.2 (B) | 131 | 98 |
| Comparative Example 5 | 18.0 | 290 | 20 | 15,500 | 360 | 4.5 | 3.0 | 2.0/3.0 (B) | 120 | 90 |

Note:
*1Penetration impact strength
YE and TE are short for energy at yield point and total energy, respectively.
D and B are short for fracture states of ductile fracture and brittle fracture, respectively.

What is claimed is:

1. A thermoplastic resin composition which comprises:
   (i) 1-99% by weight of at least one member selected from the group consisting of
      (a) a modified polypropylene (A) to which has been grafted copolymerized an unsaturated carboxylic acid or a derivative thereof,
      (b) a modified polypropylene (B) to which has been graft copolymerized an unsaturated aromatic monomer and either an unsaturated carboxylic acid or a derivative thereof,
      (c) a mixture of the modified polypropylene (A) and a polypropylene (C),
      (d) a mixture of the modified polypropylene (B) and a polypropylene (C),
      (e) a modified mixture (A') of a polypropylene (C) and a rubbery substance (H) to which mixture has been graft copolymerized an unsaturated carboxylic acid or a derivative thereof,
      (f) a modified mixture (B') of a polypropylene (C) and a rubbery substance (H) to which mixture has been graft copolymerized an unsaturated aromatic monomer and either an unsaturated carboxylic acid or a derivative thereof,
      (g) a mixture of the modified mixture (A') and a polypropylene (C), and
      (h) a mixture of the modified mixture (B') and a polypropylene (C), and
   (ii) 99-1% by weight of a thermoplastic copolymer (E) containing an acid anhydride six-membered ring moiety, and
   (2) 0.1 to 300 parts by weight of an epoxy group-containing copolymer (G).

2. The thermoplastic resin composition of claim 1, wherein the resin composition (F) consists of
   (i) 1-99% by weight of at least one modified polypropylene-based resin composition (D) selected from the group consisting of
      (a) a modified polypropylene (A) to which has been grafted copolymerized an unsaturated carboxylic acid or a derivative thereof,
      (b) a modified polypropylene (B) to which has been graft copolymerized an unsaturated aromatic monomer and either an unsaturated carboxylic acid or a derivative thereof, (c) a mixture of the modified polypropylene (A) and a polypropylene (C), and
(d) a mixture of the modified polypropylene (B) and a polypropylene (C), and
(ii) 99–1% by weight of a thermoplastic copolymer (E) containing an acid anhydride six-membered ring moiety.

3. The thermoplastic resin composition of claim 1, wherein the resin composition (F) consists of
(i) 1–99% by weight at least one modified polypropylene-based resin composition (D') selected from the group consisting of
(e) a modified mixture (A') of a polypropylene (C) and a rubbery substance (H) to which mixture has been graft copolymerized an unsaturated carboxylic acid or a derivative thereof,
(f) a modified mixture (B') of a polypropylene (C) and a rubbery substance (H) to which mixture has been graft copolymerized an unsaturated aromatic monomer and either an unsaturated carboxylic acid or a derivative thereof,
(g) a mixture of the modified mixture (A') and a polypropylene (C), and
(h) a mixture of the modified mixture (B') and a polypropylene (C), and
(ii) 99–1% by weight of a thermoplastic copolymer (E) containing an acid anhydride six-membered ring moiety.

4. The thermoplastic resin composition of claim 1, wherein the unsaturated carboxylic acid or a derivative thereof is maleic anhydride.

5. The thermoplastic resin composition of claim 2, wherein the unsaturated carboxylic acid or a derivative thereof is maleic anhydride.

6. The thermoplastic resin composition of claim 3, wherein the unsaturated carboxylic acid or a derivative thereof is maleic anhydride.

7. The thermoplastic resin composition of claim 1, wherein the resin composition (F) consists of
(i) 1–99% by weight of at least one member selected from the group consisting of
(b) a modified polypropylene (B) to which has been graft copolymerized an unsaturated aromatic monomer and either an unsaturated carboxylic acid or a derivative thereof,
(d) a mixture of the modified polypropylene (B) and a polypropylene (C),
(f) a modified mixture (B') of a polypropylene (C) and a rubbery substance (H) to which mixture has been graft copolymerized an unsaturated aromatic monomer and either an unsaturated carboxylic acid or a derivative thereof,
(h) a mixture of the modified mixture (B') and a polypropylene (C), and
(ii) 99–1% by weight of a thermoplastic copolymer (E) containing an acid anhydride six-membered ring moiety.

8. The thermoplastic resin composition of claim 7, wherein the resin composition (F) consists of
(i) 1–99% by weight of at least one member selected from the group consisting of
(b) a modified polypropylene (B) to which has been graft copolymerized an unsaturated aromatic monomer and either an unsaturated carboxylic acid or a derivative thereof, and
(d) a mixture of the modified polypropylene (B) and a polypropylene (C), and (ii) 99–1% by weight of a thermoplastic copolymer (E) containing an acid anhydride six-membered ring moiety.

9. The thermoplastic resin composition of claim 7, wherein the resin composition (F) consists of
(i) 1–99% by weight of at least one member selected from the group consisting of
(f) a modified mixture (B') of a polypropylene (C) and a rubbery substance (H) to which mixture has been graft copolymerized an unsaturated aromatic monomer and either an unsaturated carboxylic acid or a derivative thereof, and
(h) a mixture of the modified mixture (B') and a polypropylene (C), and
(ii) 99–1% by weight of a thermoplastic copolymer (E) containing an acid anhydride six-membered ring moiety.

10. The thermoplastic resin composition of claim 7, wherein the unsaturated aromatic monomer is styrene.

11. The thermoplastic resin composition of claim 8, wherein the unsaturated aromatic monomer is styrene.

12. The thermoplastic resin composition of claim 9, wherein the unsaturated aromatic monomer is styrene.

13. The thermoplastic resin composition of claim 10, wherein the unsaturated carboxylic acid or a derivative thereof is maleic anhydride.

14. The thermoplastic resin composition of claim 11, wherein the unsaturated carboxylic acid or a derivative thereof is maleic anhydride.

15. The thermoplastic resin composition of claim 12, wherein the unsaturated carboxylic acid or a derivative thereof is maleic anhydride.

16. The thermoplastic resin composition of claim 1, wherein the thermoplastic copolymer containing an acid anhydride six-membered ring moiety is a thermoplastic copolymer having
(1) a repeating unit derived from methyl methacrylate,
(2) at least one repeating unit selected from the group consisting of a repeating unit derived from methacrylic acid and a repeating unit derived from acrylic acid, and
(3) a repeating unit derived from an acid anhydride of six-membered ring having the formula,

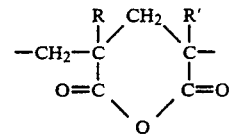

wherein R and R' are independently methyl or hydrogen,
the content of the repeating unit (1) in the copolymer being 10 to 95% by weight, the content of the repeating units (2) and (3) in the copolymer being 5 to 35% by weight, the weight ratio of the repeating unit (3) to the repeating units (2) and (3) being 55 : 100 or more, and the reduced viscosity of the copolymer, when measured at 25° C. with 1 weight% dimethyl formamide solution, being 0.3 to 1.5 dl/g.

17. The thermoplastic resin composition of claim 1, wherein the thermoplastic copolymer containing an acid anhydride six-membered ring moiety is a thermoplastic copolymer having
(1) a repeating unit derived from methyl methacrylate, (2) at least one repeating unit selected from the group consisting of a repeating unit derived from methacrylic acid and a repeating unit derived from acrylic acid, (3) a repeating unit derived from an acid anhydride of six-membered ring having the formula,

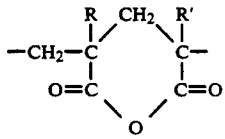

wherein R and R' are independently methyl or hydrogen, the content of the repeating unit (1) in the copolymer being 10 to 95% by weight, the content of the repeating unit (4) in the copolymer being at most 55% by weight, the content of the repeating units (2) and (3) in the copolymer being 5 to 35% by weight, the weight ratio of the repeating unit (3) to the repeating units (2) and (3) being 55 : 100 or more, and the reduced viscosity of the copolymer, when measured at 25° C. with 1 weight% dimethyl formamide solution, being 0.3 to 1.5 dl/g.

18. The thermoplastic resin composition of claim 2, wherein the thermoplastic copolymer containing an acid anhydride six-membered ring moiety is a thermoplastic copolymer having (1) a repeating unit derived from methyl methacrylate, (2) at least one repeating unit selected from the group consisting of a repeating unit derived from methacrylic acid and a repeating unit derived from acrylic acid, and (3) a repeating unit derived from an acid anhydride of six-membered ring having the formula,

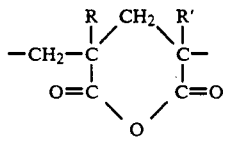

wherein R and R' are independently methyl or hydrogen, the content of the repeating unit (1) in the copolymer being 10 to 95% by weight, the content of the repeating units (2) and (3) in the copolymer being 5 to 35% by weight, the weight ratio of the repeating unit (3) to the repeating units (2) and (3) being 55 : 100 or more, and the reduced viscosity of the copolymer, when measured at 25° C. with 1 weight% dimethyl formamide solution, being 0.3 to 1.5 dl/g.

19. The thermoplastic resin composition of claim 2, wherein the thermoplastic copolymer containing an acid anhydride six-membered ring moiety is a thermoplastic copolymer having (1) a repeating unit derived from methyl methacrylate, (2) at least one repeating unit selected from the group consisting of a repeating unit derived from methacrylic acid and a repeating unit derived from acrylic acid, (3) a repeating unit derived from an acid anhydride of six-membered ring having the formula,

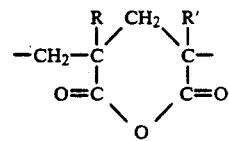

wherein R and R' are independently methyl or hydrogen, and (4) a repeating unit derived from an ethylenic $\alpha,\beta$-unsaturated monomer, the content of the repeating unit (1) in the copolymer being 10 to 95% by weight, the content of the repeating unit (4) in the copolymer being at most 55% by weight, the content of the repeating units (2) and (3) in the copolymer being 5 to 35% by weight, the weight ratio of the repeating unit (3) to the repeating units (2) and (3) being 55 : 100 or more, and the reduced viscosity of the copolymer, when measured at 25° C. with 1 weight% dimethyl formamide solution, being 0.3 to 1.5 dl/g.

20. The thermoplastic resin composition of claim 3, wherein the thermoplastic copolymer containing an acid anhydride six-membered ring moiety is a thermoplastic copolymer having (1) a repeating unit derived from methyl methacrylate, (2) at least one repeating unit selected from the group consisting of a repeating unit derived from methacrylic acid and a repeating unit derived from acrylic acid, and (3) a repeating unit derived from an acid anhydride of six-membered ring having the formula,

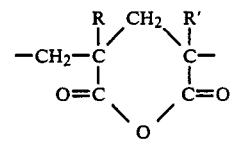

wherein R and R' are independently methyl or hydrogen, and the content of the repeating unit (1) in the copolymer being 10 to 95% by weight, the content of the repeating units (2) and (3) in the copolymer being 5 to 35% by weight, the weight ratio of the repeating unit (3) to the repeating units (2) and (3) being 55 : 100 or more, and the reduced viscosity of the copolymer, when measured at 25° C. with 1 weight% dimethyl formamide solution, being 0.3 to 1.5 dl/g.

21. The thermoplastic resin composition of claim 3, wherein the thermoplastic copolymer containing an acid anhydride six-membered ring moiety is a thermoplastic copolymer having (1) a repeating unit derived from methyl methacrylate, (2) at least one repeating unit selected from the group consisting of a repeating unit derived from methacrylic acid and a repeating unit derived from acrylic acid, (3) a repeating unit derived from an acid anhydride of six-membered ring having the formula,

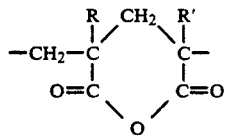

wherein R and R' are independently methyl or hydrogen, and (4) a repeating unit derived from an ethylenic $\alpha,\beta$-unsaturated monomer, the content of the repeating unit (1) in the copolymer being 10 to 95% by weight, the content of the repeating unit (4) in the copolymer being at most 55% by weight, the content of the repeating units (2) and (3) in the copolymer being 5 to 35% by weight, the weight ratio of the repeating unit (3) to the repeating units (2) and (3) being 55 : 100 or more, and the reduced viscosity of the copolymer, when measured at 25° C. with 1 weight% dimethyl formamide solution, being 0.3 to 1.5 dl/g.

22. The thermoplastic resin composition of claim 1, wherein the epoxy group-containing copolymer (G) is a copolymer of an unsaturated epoxy compound and ethylene or a terpolymer of an unsaturated epoxy compound, ethylene and an ethylenic unsaturated compound other than ethylene.

23. The thermoplastic resin composition of claim 2, wherein the epoxy group-containing copolymer (G) is a copolymer of an unsaturated epoxy compound and ethylene or a terpolymer of an unsaturated epoxy compound, ethylene and an ethylenic unsaturated compound other than ethylene.

24. The thermoplastic resin composition of claim 3, wherein the epoxy group-containing copolymer (G) is a copolymer of an unsaturated epoxy compound and ethylene or a terpolymer of an unsaturated epoxy compound, ethylene and an ethylenic unsaturated compound other than ethylene.

25. The thermoplastic resin composition of claim 1, wherein the starting material for the rubbery substance (I) or the modified rubbery substance (H) is an ethylenic copolymer rubber.

26. The thermoplastic resin composition of claim 3, wherein the starting material for the rubbery substance (I) or the modified rubbery substance (H) is an ethylenic copolymer rubber.

27. The thermoplastic resin composition of claim 1, wherein the component (i) is (a) a modified polypropylene (A) to which has been graft copolymerized an unsaturated carboxylic acid or a derivative thereof.

28. The thermoplastic resin composition of claim 2, wherein the component (i) is (a) a modified polypropylene (A) to which has been graft copolymerized an unsaturated carboxylic acid or a derivative thereof.

* * * * *